United States Patent
Litt et al.

(10) Patent No.: US 6,586,561 B1
(45) Date of Patent: Jul. 1, 2003

(54) RIGID ROD ION CONDUCTING COPOLYMERS

(75) Inventors: Morton H. Litt, University Heights, OH (US); Robert F. Savinell, Solon, OH (US); Jesse S. Wainright, Willoughby Hills, OH (US); Yue Zhang, Cleveland, OH (US)

(73) Assignee: Case Western Reserve University, Cleveland, OH (US)

( * ) Notice: Subject to any disclaimer, the term of this patent is extended or adjusted under 35 U.S.C. 154(b) by 0 days.

(21) Appl. No.: 09/507,086

(22) Filed: Feb. 18, 2000

Related U.S. Application Data

(60) Provisional application No. 60/120,482, filed on Feb. 18, 1999.

(51) Int. Cl.[7] ................ C08G 73/10; C08G 69/26
(52) U.S. Cl. ............... 528/353; 528/125; 528/128; 528/170; 528/171; 528/172; 528/173; 528/174; 528/176; 528/183; 528/184; 528/185; 528/189; 528/190; 528/220; 528/223; 528/225; 528/228; 528/229; 528/327; 528/350; 528/352; 528/353
(58) Field of Search .................. 528/353, 125, 528/128, 184, 185, 170, 171, 172, 189, 190, 220, 223, 225, 228, 229, 327, 350, 352

(56) References Cited

U.S. PATENT DOCUMENTS

| | | | | |
|---|---|---|---|---|
| 4,390,603 A | | 6/1983 | Kawona et al. ............... 429/30 |
| 4,849,311 A | | 7/1989 | Itoh et al. .................... 429/192 |
| 4,973,530 A | | 11/1990 | Vanderborgh et al. ........ 429/13 |
| 5,126,462 A | * | 6/1992 | Greber et al. ............... 549/241 |
| 5,403,675 A | | 4/1995 | Ogata et al. .................. 429/33 |
| 5,468,574 A | | 11/1995 | Ehrenberg et al. ............ 429/33 |
| 5,525,436 A | | 6/1996 | Savinell et al. ............... 429/30 |
| 5,679,482 A | | 10/1997 | Ehrenberg et al. .......... 429/249 |
| 5,783,324 A | | 7/1998 | Binder et al. ................. 429/31 |
| 5,795,496 A | | 8/1998 | Yen et al. .................. 252/62.2 |
| 5,798,188 A | | 8/1998 | Mokohyama et al. ......... 429/34 |
| 6,066,710 A | * | 5/2000 | Becker et al. ............... 528/170 |
| 6,245,881 B1 | * | 6/2001 | Faure et al. ................ 528/353 |
| 6,376,129 B2 | * | 4/2002 | Faure et al. ................ 429/306 |

FOREIGN PATENT DOCUMENTS

WO 97/42253 5/1997

OTHER PUBLICATIONS

Zhang et al. "Molecular Design Considerations in the Synthesis of High Proton Conducting PEMs for Fuel Cells".
Wang et al. "A $H_2/O_2$ Fuel Cell Using Acid Doped Polybenzimidazole As Polymer Electrolyte" *Electrochimica Acta.*, vol. 41, No. 2, 193–197 (1996) no month.
Mosdale et al. "Water Profile Determination in a Running Proton Exchange Membrane Fuel Cell Using Small–angle Neutron Scattering" *Journal of Membrane Science*, 118, 269–277 (1996) no month.
Wasmus et al. "Methanol Oxidation and Direct Methanol Fuel Cells: a Selective Review" *Journal of Electroanalytical Chemistry*, 461, 14–31 (1999) no month.
Spiliopoulos et al. "Synthesis of Soluble, Blue–Light–Emitting Rigid–Rod Polyamides and Polyimides Prepared from 2',6',3",5'''–Tetraphenyl–or Tetra(4–Biphenylyl)–4,4'''–diamino–p–quinquephenyl" *Macromolecules* 31, 515–521 (1998) no month.
Faure et al. "Sulfonated Polyimides as Proton Exchange Membrane for $H_2/O_2$ Fuel Cells" 4th European Technical Symposium on Polyimides and High Performance Polymers, 414–422.
Mercier et al. "Fuel Cell Membranes Based on Polyimide Materials"(abstract) Polycondensation '98 Final Program.
Rusarov et al. "Advances in the Synthesis of Poly(perylene carboximides) and Poly(napthalene carboximides)" *Polymer Science, Ser. A*, vol. 41, No. 1, 2–21 (1999) no month.
Mikroyannidis. "Rigid–Rod Polyamides and Polyimides Prepared from 4,3"–Diamino–2', 6'–D1(2–naphthyl)–p–terphenyl and 2',6',3",5'''–Tetra(22–naphthyl)–4,4"–Diamino–p–quiquephenyl" *Journal of Polymer Science:PartA:Polymer Chemistry*, vol. 37, 15–24 (1999) no month.
Mikroyannidis. "Soluble, UV–Fluorescent Polyamides and Polyimides Containing Oligophenyls in the Main Chain and Highly Phenylated Side Groups" *Macromal. Chem. Phys.*, 200, 2327–2331 (1990) no month.
Kreuer. "Proton Conductivity: Materials and Applications" *Chem. Mater.*, 8, 610–641 (1996) no month.
Escribeno et al. "Volumic Electrodes of Fuel Cells with Polymer Electrolyte Membranes: Electrochemical Performances and Structural Analysis by Thermoporometry" *Electrochimica Acta*, vol. 43, Nos. 14–15, 2195–2202, (1998) no month.
Sakaguchi et al. "Synthesis and Characterization of Aromatic Polyamides Derived from New Phenylated Aromatic Diamines" *Polymer Journal*, vol. 24, No. 10, 1147–1154 (1992) no month.
Dhar. "On Solid Polymer Fuel Cells" *J. Electroanal. Chem.*, 357, 237–250 (1993) no month.
Prater. "Polymer Electrolyte Fuel Cells: A Review of Recent Developments" *Journal of Power Sources*, 51, 129–144 (1994).

* cited by examiner

*Primary Examiner*—P. Hampton-Hightower
(74) *Attorney, Agent, or Firm*—Fay, Sharpe, Fagan, Minnich & McKee, LLP

(57) ABSTRACT

Sulfonated polyimide polymers incorporating bulky monomers are disclosed. The polymers have a liquid crystalline structure and exhibit high conductivity, high water uptake and water stability over a range of relative humidities and temperatures. The polymers are particularly adapted for use as a polymer electrolyte membrane in fuel cells.

72 Claims, 6 Drawing Sheets

RIGID ROD ION CONDUCTING COPOLYMERS

CROSS REFERENCE TO RELATED APPLICATIONS

This application claims priority from U.S. Provisional Application No. 60/120,482, filed Feb. 18, 1999.

This invention was made with government support under Grant No. DARPA F30602-97-2-0311 Air Force. The government has certain rights in this invention.

FIELD OF THE INVENTION

The present invention relates to a polymeric material particularly adapted for use as a polymer electrolyte membrane in a fuel cell. Specifically, the present invention relates to rigid rod copolyimide polymers containing sulfonic acid groups. More specifically, the present invention relates to a copolyimide containing sulfonic acid constituents, having a rigid rod, liquid crystalline structure, and which incorporates bulky, displacing or angled monomers along the polymer chain. Incorporation of bulky monomers in the polymer chain creates regions of access along the chain, thereby exposing sulfonic acid groups, also located along the chain, which in turn enhances conductivity properties of the polymer.

BACKGROUND OF THE INVENTION

Solid, proton conducting polymer electrolyte membranes (PEMs) provide several key features in present technology fuel cells. These features include providing a conduction medium for protons, supporting and separating electrodes, and separating fuel from oxidizer.

Consequently, polymer electrolyte membranes must exhibit ion exchange properties that allow sufficient conductivities to be achieved. In addition, such membranes must exhibit high chemical and mechanical resistance under extreme operating conditions which are typically encountered in many fuel cell applications.

An example of a commercially available polymer electrolyte membrane is Nafion® and is available from DuPont. Nafion® is adequate for use in most current fuel cell applications, but exhibits several deficiencies. It has poor conductivity at low relative humidities and can not easily be used at temperatures above 80° C. because it dries out. Furthermore, Nafion® exhibits high osmotic drag which contributes to difficulties in water management at high current densities. In addition, high methanol permeability in Nafion® contributes to detrimental fuel cross over, in which fuel passes across the anode, through the Nafion® membrane and to the cathode. Consequently, in instances of fuel cross over, methanol is oxidized at the cathode and fuel cell efficiency decreases.

It would be beneficial to identify polymeric materials suitable for use as polymer electrolyte membranes in a fuel cell that exhibit improved properties over currently available materials. Specifically, it would be desirable to provide a polymeric material that exhibits increased conductivity, improved thermal stability, reduced methanol permeability and improved mechanical properties over presently available polymer electrolyte membranes such as Nafion®.

SUMMARY OF THE INVENTION

The present invention achieves all of the foregoing objectives and provides, in a first aspect, a rigid rod ion conducting copolymer comprising three types of monomers. The first monomer is a generally non-polar monomer that is capable of binding a diamine. The second monomer is a diamine monomer having sulfonic acid groups. The third monomer is either a diamine or a dianhydride and is relatively bulky and capable of reacting with the first or second monomer. The copolymer exhibits liquid crystal behavior.

In another aspect, the present invention provides a polymer particularly adapted for use as a membrane in a fuel cell. The polymer exhibits a certain structure defined herein as either Structure I or II.

In a further aspect, the present invention provides a polymer electrolyte membrane comprising a polymer having either Structure I or II and a particular thickness range.

In an additional aspect, the present invention provides a fuel cell comprising a cathode, an anode, and a polymer electrolyte membrane situated between the cathode and anode. The polymer electrolyte membrane comprises a polymer having a structure defined herein as either Structure I or II.

DESCRIPTION OF THE PREFERRED EMBODIMENTS

Figure 1:
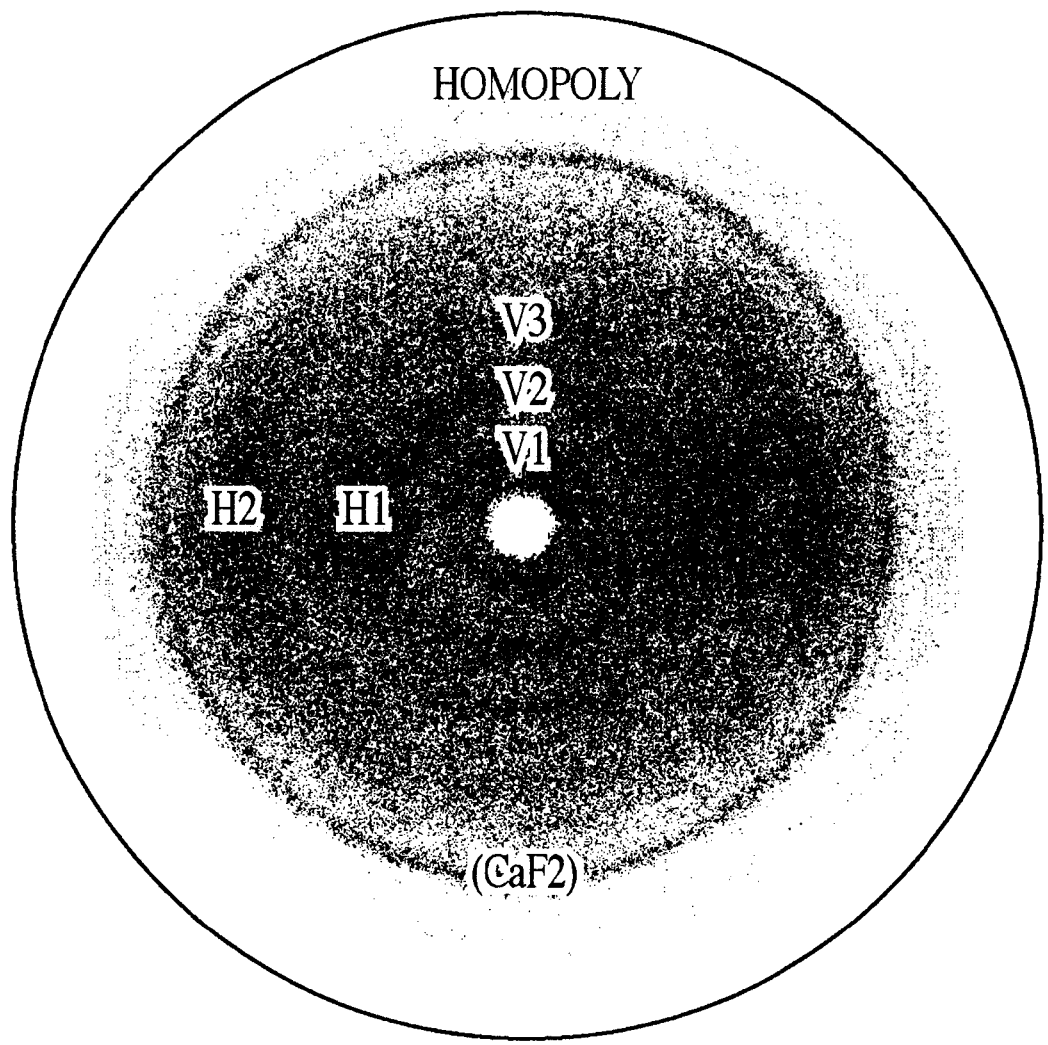
FIG. 1 is an X-ray diffraction pattern of a polyimide fiber according to the present invention.

The present invention provides a rigid rod copolymer particularly adapted for use as an electrolyte membrane in a fuel cell. The term "rigid rod" as used herein refers to the polyimide molecule and its linear and rigid characteristics. The invention is based on the discovery that rigid rod ion conducting polyimides, incorporating a bulky diamine comonomer, are suitable as polymer electrolyte membranes and exhibit improved physical properties compared to conventional polymer electrolyte membranes.

The preferred embodiment polyimides according to the present invention are preferably liquid crystals. The term "liquid crystal" as used herein refers to a state in which the polymer molecules exhibit a certain degree of orientational order, between crystalline and amorphous states. In solution, molecules according to the preferred embodiment of the present invention are generally free to diffuse about. But, when in the form of a solid membrane, the molecules are generally fixed in place and exhibit some degree of liquid crystal order. This is particularly evident upon application of a deforming load to the membrane. When solvent from a solution of the preferred embodiment molecules is evaporated, the molecules attain their orientation and are considered liquid crystalline. Molecules demonstrating such characteristics are said to be lyotropic liquid crystals. Liquid crystal polymers are described in greater detail in "Liquid Crystalline Materials," Kirk-Othmer Encyclopedia of Chemical Technology, 4th Edition, Vol. 15, 372–409 (1995), and at the website http://plc.cwru.edu/, both of which are incorporated herein by reference.

Preferred embodiment rigid rod ion conducting polymers according to the present invention exhibit improved conductivity, water stability, methanol permeability and mechanical properties over commercially available membrane polymers.

A. Chemistry

Rigid rod ion conducting polymers of the present invention are preferably polyimide structures, and most preferably aromatic in nature, having high thermal stability, good oxidation resistance and mechanical strength.

A preferred polymer of the present invention has the structure depicted by Structure I.

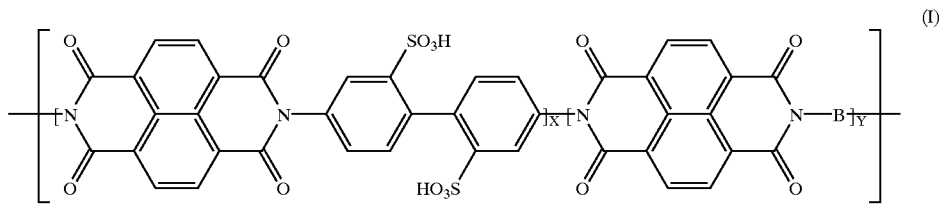

(I)

Another preferred polymer according to the present invention has a structure analagous to Structure I, i.e., a Structure I variant, as follows:

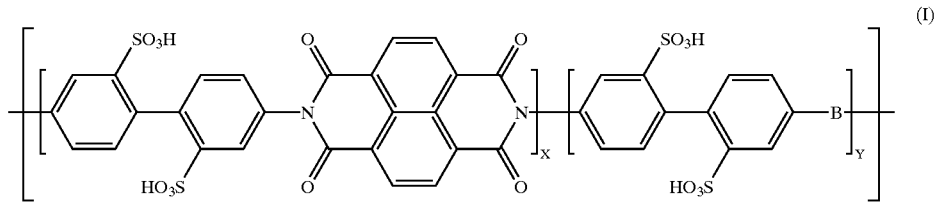

(I)

The preferred embodiment rigid rod ion conducting polymer of the present invention comprises three main components. The first component is a monomer that is capable of binding diamines. The monomer is preferably non-polar but may contain ionic groups. The second component is a diamine monomer containing sulfonic acid groups. The first and second component monomers combine to produce a substantially linear rigid rod polymer. The diamine monomer with sulfonic acid groups provides conductivity and promotes passage of hydronium ions through the polymeric matrix. The third component is a second diamine monomer or dianhydride monomer containing bulky side groups or having a geometry that results in the diplacement of adjacent polymer molecules apart from one another. Such displacement creates regions of access or long nanopores along respective polymer chains. The regions of access or nanopores along the polymer chains expose sulfonic acid groups along the backbone of the respective polymers. The third component reacts with the first or second component. In addition to the previously noted first, second and third components, the preferred embodiment polymer may include other components such as other monomers, that do not significantly detract from the overall attractive and beneficial properties of the resulting polymer.

The backbone of the preferred embodiment rigid rod polymers is preferably a polyimide copolymer formed from the previously noted first component monomer and the second component diamine.

The first component monomer is preferably a dianhydride, more preferably naphthalgene tetracarboxy dianhydride or perylene tetracarboxy dianhydride, and most preferably 1,4,5,8-tetracarboxy naphthalene dianhydride (TCND). Additional details of perylene tetracarboxy dianhydride, related molecules, and their synthesis are provided in "Advances in the Synthesis of Poly (perylenecarboximides) and Poly(napthalene carboximides)," A. L. Rusanov et al., Polymer Science, Vol. 41, No. 1, 1999, p. 2–21, herein incorporated by reference. The first component monomer gives the present invention polymer a linear, liquid crystalline rigid rod backbone that imparts desirable mechanical properties to the resulting polymer.

A linear diamine monomer containing sulfonic acid groups serves as the second component of the rigid rod polymer backbone. Sulfonic acid groups in the backbone of the polymer chain provide for proton conductivity and when the polymeric material is formed into a membrane, promote the passage of hydronium ions across the membrane. The diamine monomer containing sulfonic acid groups is preferably an aromatic sulfonic acid. Such sulfonic acids are stable to at least 150° C. A most preferred diamine monomer containing sulfonic acid(s) is benzidene 2,2'-disulfonic acid (DAPS). DAPS is relatively inexpensive and, when used with TCND, results in a polymer with a low equivalent weight. It will be appreciated that the second component diamine monomer preferably contains sulfonic acid groups. However, the present invention encompasses polymers comprising similar or analogous groups. This is explained in greater detail herein.

The B unit of Structure I serves as the third component and preferably, is a second diamine monomer containing bulky side groups or possessing a geometry that serves to displace the polymer chains apart and maintain their separation along the entire length of the polymer chain, or substantially so. Forcing the chains apart creates relatively long nanopores lined with sulfonic acid groups that can strongly adsorb and retain water. Consequently, conductivity may be kept relatively high even at low levels of humidity. Examples of other suitable diamines for use as the third component include the sulfonic acid containing diamines described in WO 97/42253 to Faure et al., herein incorporated by reference.

When the B unit of the polymer is DAPS, the homopolymer is formed. The homopolymer, however, is water sensitive and generally not suitable for use as a polymer electrolyte membrane if such membrane is to contact hot liquid water. Although the present invention is primarily directed to water insoluble polymers, the invention may encompass water soluble polymers. Additional details of water soluble rigid rod polymers are described in "Synthesis and Investigation of New Water Soluble Sulfonated Rigid-Rod Polynaphtholyleneimide," Timofeeva et al., Macromol, Symp., 106, 345–351 (1996), herein incorporated by reference.

Diamine monomers preferred as the B unit of Structure I in a preferred polymer of the present invention are selected from the group including, but not limited to, 1,4-p-phenylene diamine (PDA); 4,4'-(9 fluorenyl) dianiline (FDA); 4,4'-oxydianiline (ODA); 1,4-bis(4-aminophenyl)-2,3,5-triphenyl benzene ((3P)TDA); 1,4-bis(4-aminophenyl)-2,3,5,6-tetraphenyl benzene ((4P)TDA); 2,2'-dibenzoyl-benzidine (DBB); 1,4 bis-(4-aminophenyl)-2,3-di(biphenyl)-5,6-diphenyl benzene (DBPDPDA); 1,4-bis-(4-aminophenyl)-2,3,-di(2-naphthyl)-5,6-diphenyl benzene (DNDPDA); 1,1'-bis-(4-aminophenylene)-4,4'-(1,4-phenylene) bis-(2,6-diphenyl pyridinium tetrafluoroborate); 1,1'-bis-(4-aminophenylene)-4,4'-(1,4-phenylene) bis-(2,6-bis(4-methyl phenylene)pyridinium tetrafluoroborate); 1,1'-bis-(4-aminophenylene)-4,4'-(1,4-phenylene) bis-(2,6-bis(4-ethoxy phenlyene) pyridinium tetrafluoroborate); 2',6',3", 5''' tetra (R-phenyl) 4,1""-diaza-pentaphenylene diamine (NHA [R=H]; NMA [R=CH$_3$], NEA [R=ethoxy]); 1,5-diaminonaphthalene (1,5-DAN); 2,6-diaminoanthraquinone (2,6-DAA); 1,5-diaminoanthraquinone (1,5-DAA); Dm-APNTCDI; tris(4-aminophenyl) methanol (TAM); 2,2'-bis(trifluoro methyl)benzidene (TFMB); and 3,8-diamino-6-phenylphenanthridine (DAPP).

Additionally, the B unit monomer may be selected from the group including, but not limited to the dianhydride equivalents of the imide monomer of the polyimide described in WO 97/42253 to Faure et al. Examples of other suitable diamines for use as the B component include the diamines described in WO 97/42253 to Faure et al. Other aspects and details of monomers that could be used as the B unit, depending upon the desired properties of the resulting polymer, are set forth in WO 97/42253 to Faure, et al.

The B unit monomer may also be a dianhydride or diamine selected from the group including, but not limited to:

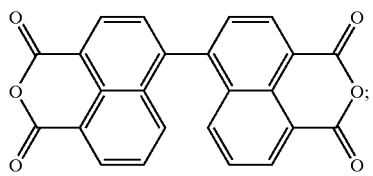

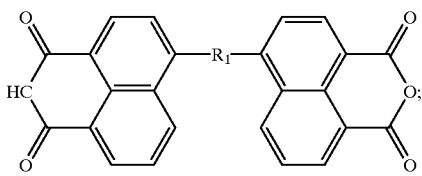

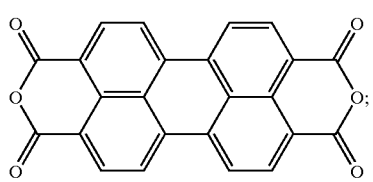

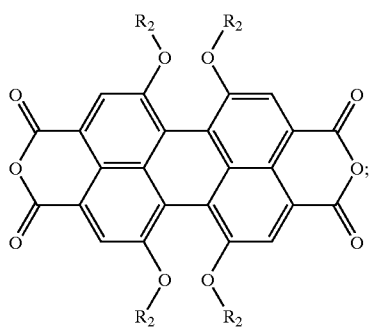

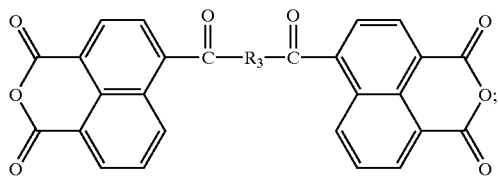

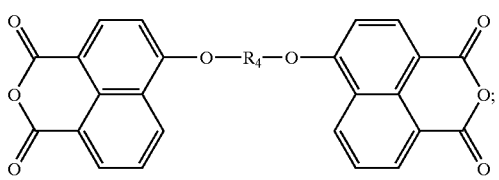

-continued
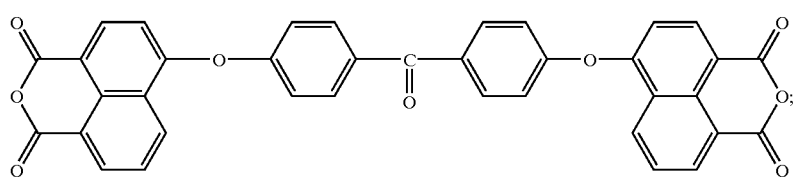
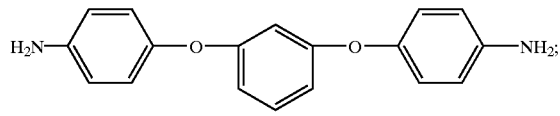
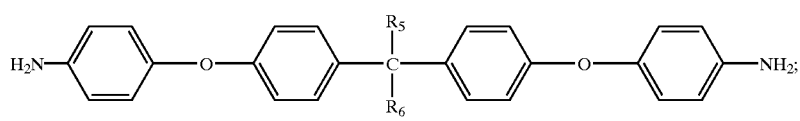
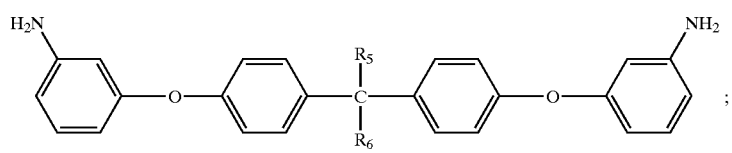
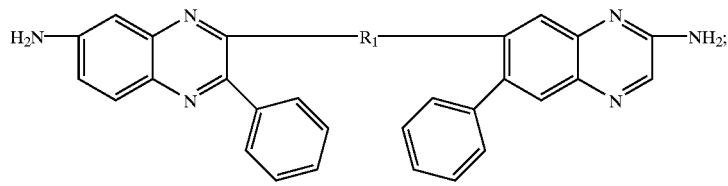
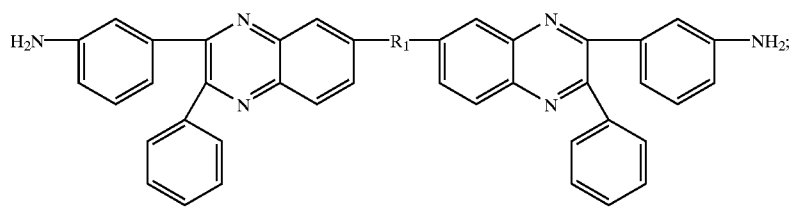
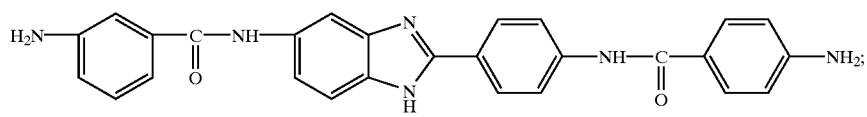
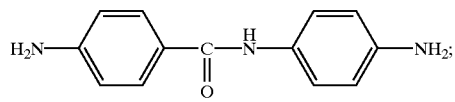
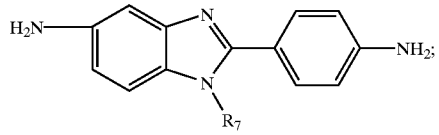
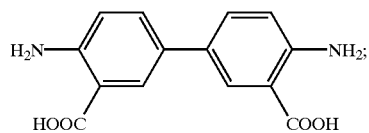
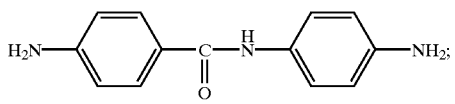
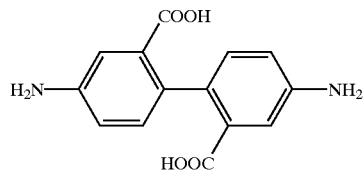
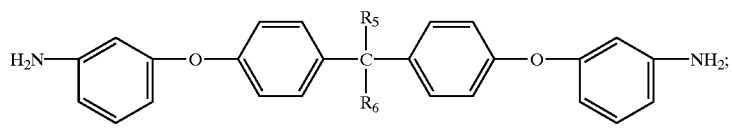

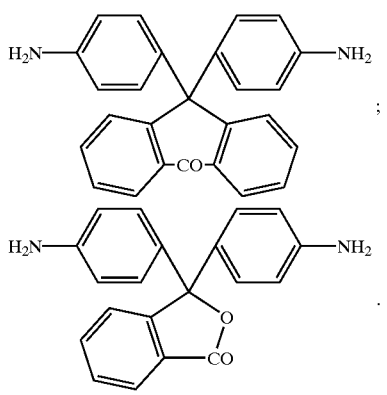

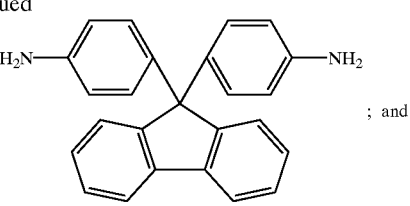; and where $R_1$ is:

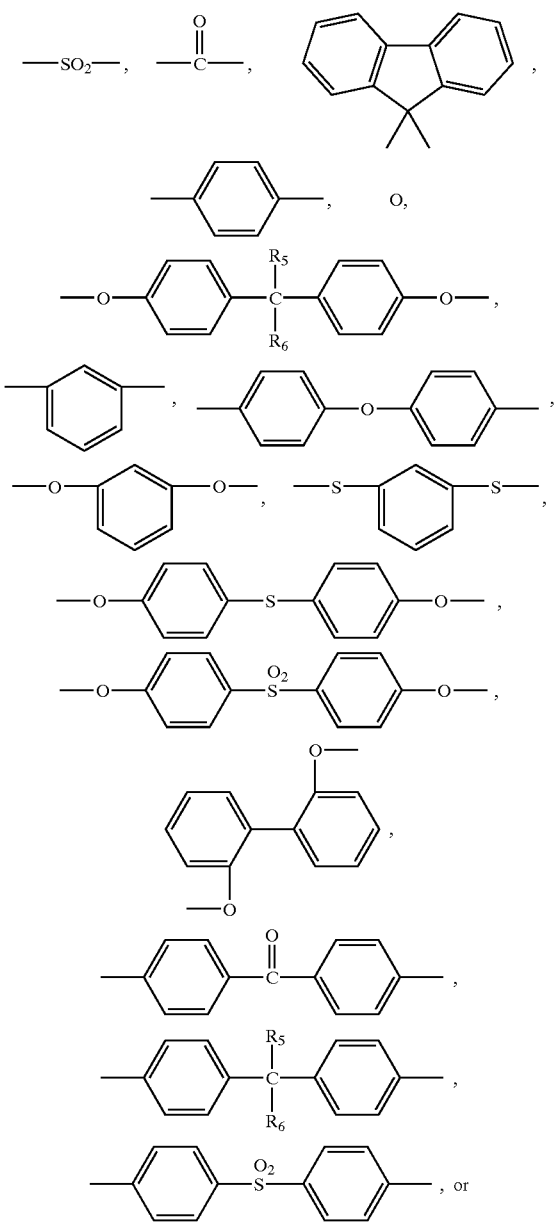

where $R_2$ is:

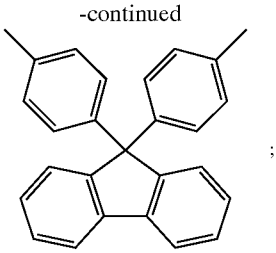

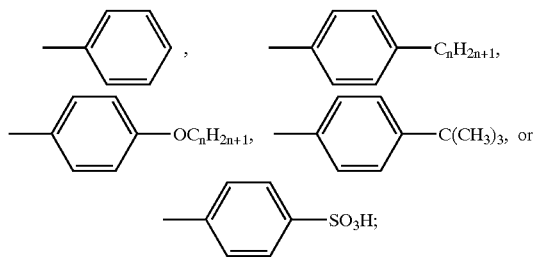

wherein $R_3$ and $R_4$ are:

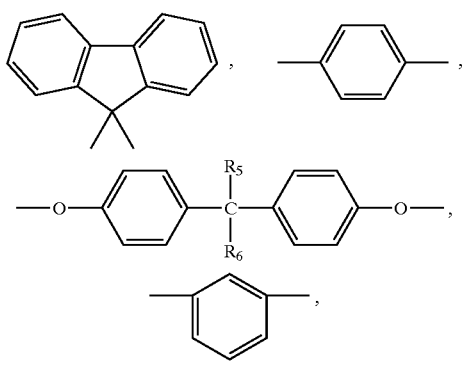

and where $R_5$, $R_6$, and $R_7$ are hydrogen, trifluoro methyl, alkyl groups having from 1 to about 8 carbon atoms, or an aromatic structure.

When the B unit monomer is a dianhydride, the dianhydride is preferably based upon a six-membered ring. However, the present invention encompasses polymers having as B units, dianhydrides derived from rings of greater or lesser than six members.

In addition to the foregoing, it is contemplated that a wide array of commercially available aromatic diamines are suitable for use as the B unit in Structure I.

It will be understood that the selection of monomers for the B unit may utilize one, two, three, or more, and generally any combinations of the aforementioned monomers.

PDA, FDA, ODA, 1,5-DAN, TAM, and TFMB are commercially available compounds. (3P)TDA, (4P)TDA, DBP-DPDA and DNDPDA are synthesized according to known procedures as described by Sakaguchi et al. in *Polym. J.*, 1992, 24 (10), 1147, hereby incorporated by reference. NHA, NMA, and NEA are synthesized according to known procedures described by Spiliopoulis et al. in *Macromolecules*, 1998, 31,515, also hereby incorporated by reference.

DBB is synthesized via Ullman coupling of 2-chloro, 5 nitro benzophenone and reduction of the nitro groups to amines.

Comonomers used as the B unit in the preferred polymers of the present invention may be classified according to their structure and the location of the amine groups. For example, PDA is a small linear comonomer. FDA and ODA are angled comonomers, in that the amine groups are not in a linear arrangement.

DBB; (3P)TDA; (4P)TDA, DBPDPDA; DNDPDA, 1,1'-bis-(4-aminophenylene)-4,4'-(1,4-phenylene) bis-(2,6-diphenyl pyridinium tetrafluoroborate); 1,1'-bis-(4-aminophenylene)-4,4'-(1,4-phenylene) bis-(2,6-bis(4-methyl phenylene)pyridinium tetrafluoroborate); 1,1'-bis-(4-aminophenylene)-4,4'-(1,4-phenylene) bis-(2,6-bis(4-ethoxy phenylene)pyridinium tetrafluoroborate); NHA, NMA; NEA and 3,8-diamino-6 phenylphenanthridine (DAPP) are monomers having a linear chain, amine terminated at both ends, with bulky pendent groups attached to the chain.

1,5 DAN; 2,6 DAA; 1,5 DAA; and Dm-APNTCDI are displacing comonomers that displace the polymer backbone laterally without changing its direction, such that sections or portions of the polymer chain are not necessarily coaxial, but are still co-linear, or substantially so. Displacing comonomers also serve to separate the polymer chains and create nanopores.

TAM is a tri-functional amine monomer. TFMB is a linear non-polar fluorinated diamine monomer.

As will be appreciated, a wide array of monomers may be used as the B unit in the preferred polymers of the present invention. Monomers may be utilized as the B unit even if decreases or detrimental changes occur with respect to one or more properties of the resulting polymer, e.g., conductivity, as long as offsetting beneficial changes in other properties occur, such as high temperature stability or mechanical strength.

The synthesis of rigid rod polyimides is known in the art. Polyimides of the present invention are preferably formed by first synthesizing an amine terminated oligomer using DAPS and TCND. This composition is then reacted with two equivalents of TCND and a suitable second diamine monomer, i.e., the B unit, to form a polymer having the formula of Structure I. An alternative synthetic approach is to form an anhydride terminated polymer that is then reacted with the second diamine. In a preferred embodiment polymer according to Structure I, X represents the number of repeat units for the TCND/DAPS comonomer segment and Y represents the number of repeat units for the comonomer segment comprising a bulky amine functionalized monomer and TCND. In a preferred polymer according to the present invention, the ratio of X to Y is preferably from about 0.01 to about 0.5, more preferably from about 0.02 to about 0.25, and most preferably from about 0.025 to about 0.10. The value of Y is preferably from about 1 to about 5, more preferably from about 1 to about 4, and most preferably from about 1 to about 2. The value of 1 is applicable for the case of random copolymers.

The overall molecular weight or chain length of the preferred embodiment polymers of the present invention should generally be as large as possible so as to promote beneficial mechanical properties for the polymer. However, the molecular weight should also be such so that the previously described liquid crystal properties are exhibited.

A useful indication of molecular weight is inherent or intrinsic viscosity (IV). A comprehensive discussion of intrinsic viscosity and its measurement and calculation is provided in the Polymer Handbook, J. Brandrup, et al., Fourth Edition, 1999, Section VII, herein incorporated by reference. The intrinsic viscosity of the preferred embodiment polymers is preferably at least about 1.0 dL/g, more preferably at least about 1.5 dL/g, and most preferably greater than 2.0 dL/g, such as for instance up to 20.0 dL/g. For the preferred embodiment polymers described herein, intrinsic viscosity is measured using 0.5% solutions of the polymer in DMSO at 30° C.

The present invention provides additional related polymers such as those defined by the general formula given in Structure II:

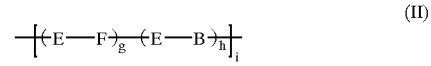

(II)

wherein g represents the number of monomer sequences of the copolymer comprised of monomers E and F, h represents the number of monomer sequences in the copolymer comprised of monomers E and B, and i represents the total number of sequences, i.e., $(EF)_g$ and $(EB)_h$. In the preferred polymers of the present invention, the mole ratio of ionic sequences $g/(g+h)$, is preferably between about 99 to about 50 mole percent, more preferably between about 98 to about 80 mole percent, and most preferably between about 97.5 to 90 mole percent. Furthermore, in the preferred polymers of the present invention $h/(g+h)$ is preferably between about 1 to about 50 mole percent, more preferably about 2 to about 20 mole percent, and most preferably about 2.5 to about 10 mole percent.

Regarding the composition of Structure II, E is preferably a dianhydride, more preferably naphthalene tetracarboxy dianhydride or perylene tetracarboxy dianhydride, and most preferably 1,4,5,8 tetra carboxy naphthalene dianhydride (TCND). F is preferably a sulfonic acid containing diamine, more preferably an aromatic sulfonic acid containing diamine, and most preferably benzidene 2,2'-disulfonic acid (DAPS). B is a diamine monomer or dianhydride monomer containing bulky side groups or having a geometry that results in the displacement of adjacent polymer molecules. B is preferably a monomer selected from the group consisting of, but not limited to, the previously noted monomers for the B unit in Structure I.

An alternative to the composition of Structure II is possible,

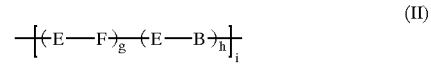

(II)

wherein F is preferably a dianhydride, more preferably naphthalene tetracarboxy dianhydride or perylene tetracarboxy dianhydride, and most preferably 1,4,5,8 tetracarboxy dianhydride (TCND). E is preferably a sulfonic acid containing diamine, more preferably an aromatic sulfonic acid containing diamine, and most preferably 2,2'-disulfonic acid (DAPS). B is a dianhydride monomer containing bulky side groups or having a geometry that results in the displacement of adjacent polymer molecules. B is preferably a monomer selected from the group consisting of, but not limited to, the previously noted monomers for the B unit in Structure I.

Polymers according to the present invention are not limited to having a single type of monomer as the B unit as described in Structures I and II. Rather, the present invention contemplates that one or more of any suitable monomers may be used as the B unit to form a polymer according to the present invention.

B. Features of Present Invention Polymers

The preferred embodiment rigid rod polyimides of the present invention exhibit several important characteristics, making them attractive for a wide variety of applications. In particular, the present invention polyimides may be used as an electrolyte membrane in a fuel cell. Moreover, the present invention encompasses membranes comprising the preferred polymers defined by Structures I and II. And, the present invention includes fuel cells that employ polymeric membranes comprising polymers described herein and defined by Structures I and II. These aspects are described in greater detail herein.

Electrolyte membranes are disclosed in U.S. Pat. Nos. 4,849,311 and 5,525,436, both of which are incorporated herein by reference. Proton conductive materials are described in "Proton Conductivity: Materials and Applications," *Chem. Mater.*, 1996, 8, 610–641; also incorporated herein by reference.

Copolymers are referred to herein using a shorthand notation described as follows. The first letter signifies the type of copolymer, i.e., either random (R) or block (B) copolymer. The second letter or series describes the comonomer used as the B unit in Structures I and II, usually represented by the first letter of the comonomer. The number at the end of the shorthand name denotes the mole percent of comonomer used. For example, the copolymer labeled RF5 indicates a random copolymer utilizing FDA as the B unit comonomer at 5 mole percent. In the case of block copolymers, average block lengths are shown in parentheses immediately following the mole percent listing.

The preferred embodiment rigid rod polyimides of the present invention exhibit a nematic liquid crystalline structure, arising from the preferred TCND/DAPS polymer backbone. Nematic liquid crystals do not exhibit a positional order or arrangement but rather exhibit a directional order. A liquid crystal rigid rod structure allows for relatively small amounts of a bulky diamine comonomer to effectively push adjacent polymer backbones apart and keep them apart along the entire length of the chain, or substantially so.

X-ray diffraction patterns of the present invention polyimides were obtained to determine the crystalline character of the polymers. The effect of third component diamine comonomers on intermolecular spacing in the polyimides was determined via d-spacing measurements.

Flat plate X-ray fiber diffraction patterns of polyimide fibers, drawn from m-cresol solutions and acidified, were obtained under vacuum using a Searle toroidal X-ray camera with Ni-Filtered $CuK_2$ radiation. The d-spacings were calibrated with $CaF_2$.

X-ray patterns similiar to that displayed in FIG. 1 were obtained for all the polyimide fibers and are typical of rigid rod nematic liquid crystals. X-ray diffraction patterns of cast films, with the beam parallel to the film surface, showed similar but less well ordered patterns.

Measured d-spacing data for selected polyimides is presented in Table 1. Type "a" polyimides utilize linear, small cross-section diamines. Type "b" polyimides utilize angled diamines. Type "c" polyimides utilize linear, large cross-section diamines.

TABLE 1

Measured d-spacings of selected polyimides.

| | | Equatorial Diffractions, Å | | Meridional Diffractions, Å | |
|---|---|---|---|---|---|
| Type | Polymide | $d_{H1}$* | $d_{H2}$ | $d_{v2}$ | $d_{v3}$ |
| | Homopolymer | 6.03 | 3.81 | 8.03 | 5.42 |
| a. | BP10(18/2) | 5.83 | 3.70 | 8.11 | 5.50 |
| b. | RF5 | 6.44 | 3.59 | 8.02 | 5.49 |
| | RO5 | 6.32 | 3.74 | 8.08 | 5.52 |
| c. | R(3P)T5-1 | 6.23 | 3.74 | 8.09 | 5.47 |
| | R(3P)T5-2 | 6.43 | 3.76 | 8.12 | 5.49 |
| | R(4P)T5 | 6.14 | 3.78 | 8.11 | 5.49 |
| | RNMA5 | 6.21 | 3.81 | 7.95 | 5.50 |

*$d_{H1}$ is the intermolecular spacing and varies with the comonomer cross-sectional area.

As shown in FIG. 1, the $V_2$ and $V_3$ reflections are sharp, reflecting the chain backbone composition. The $H_1$ and $H_2$ reflections are broad due to the liquid crystal packing of the chain.

The first equatorial x-ray reflection, $d_{H1}$, represents the intermolecular spacing for the polymers. Interchain spacing is greater in polymers utilizing angled or bulky comonomers, i.e., types "b" and "c", respectively, of Table 1 than in either a polymer containing a linear diamine having a small cross-sectional area, i.e., type "a" of Table 1, or the homopolymer. Thus, angled or bulky comonomers, as utilized in polymers of types "b" and "c" of Table 1, prevent the rigid rod chains from packing closely together, thereby generating nanopores and exposing sulfonic acid groups along the polymer backbone.

Increased conductivity, particularly as compared to Nafion®, is observed in preferred embodiment rigid rod polyimides of the present invention. The polymer backbone is forced apart by the monomer units containing bulky pendent groups, thereby creating long nanopores lined with sulfonic acid groups. Exposed sulfonic acid groups are easily accessible to water, resulting in increased conductivity.

Conductivity, an essential feature of polymer electrolyte membranes, was measured to effectively compare polymers of the present invention to the corresponding homopolymer and Nafion®.

Proton conductivity was measured using a four point probe technique with a BC2000 potentiostat. Polymer samples were enclosed in plastic bottles having a constant relative humidity using LiCl solutions at different concentrations. Conductivity of the different polymer samples was measured at about 100%, 75%, 50%, 35%, and 15% relative humidity.

High temperature measurements were run in a stainless steel chamber at 100% relative humidity below 100C and at 1 Bar pressure above 100° C.

Figure 2:
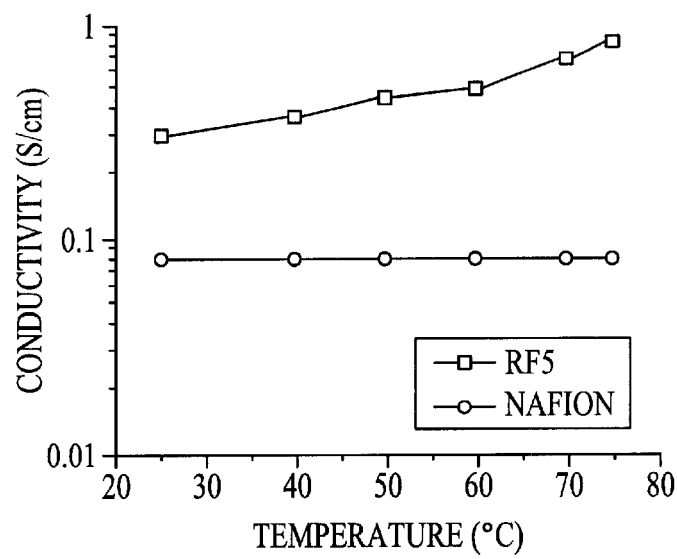
FIG. 2 is a graphical representation of data provided in Table 2 set forth below and compares conductivity of RF5 to Nafion®.

Table 2 and FIG. 2 demonstrate that polymeric materials according to the present invention, specifically the RF5 polymer, exhibit improved conductivity compared to Nafion® over a wide range of temperatures at 100% relative humidity and a pressure of 1 atm. The conductivity of Nafion® remains generally constant as the temperature increases, while the conductivity of RF5, which is significantly higher than Nafion® at even the lowest temperature tested, increases with increasing temperatures.

TABLE 2

Conductivity of RF5 and Nafion ® vs. temperature at 1 atm. water vapor pressure.

| Temperature (° C.) | Conductivity (S/cm) | |
|---|---|---|
| | RF5 | Nafion ® |
| 25 | 0.30 | 0.08 |
| 40 | 0.37 | 0.08 |
| 50 | 0.45 | 0.08 |
| 60 | 0.49 | 0.08 |
| 70 | 0.67 | 0.08 |
| 75 | 0.80 | 0.08 |

Polymers of the present invention also exhibit improved conductivity compared to Nafion® over a range of relative humidities. Tables 3 through 11 show conductivities of selected present invention polyimides over a range of relative humidities. Conductivity measurements were performed at room temperature, unless otherwise noted. Tables 3, 4 and 6 compare the conductivities of various present invention polyimides to the conductivities of Nafion® and homopolymer. Table 5 compares three different polyimides having various concentrations of comonomer (i.e., B units) to homopolymer. Tables 7 through 9 list the conductivities of different polyimides having different comonomer concentrations. And, Tables 10 and 11 compare conductivities of random and block copolymers of FDA having 10% (Table 10) and 20% (Table 11) of the comonomer.

TABLE 3

Conductivity of copolyimides as a function of relative humidity compared with Nafion ® and homopolymer.

| Relative Humidity (%) | Conductivity* (S/cm) | | | | | | |
|---|---|---|---|---|---|---|---|
| | RD5 | RF5 | RO5 | R([3P)T5 | R([4P)T5 | Homo-polymer | Nafion ® |
| 100 | 0.29 (0.04) | 0.24 (0.07) | 0.21 (0.14) | .0.13 (0.06) | 0.17 (0.002) | 0.19 (0.07) | 0.08 |
| 75 | 0.023 (0.006) | 0.042 (0.016) | 0.03 (0.008) | 0.031 (0.003) | 0.042 (0.005) | 0.018 (0.003) | 0.03 |
| 50 | 0.009 (0.004) | 0.012 (0.003) | 0.018 (0.002) | 0.012 (0.002) | 0.006 (4.0E-A) | 0.004 (—) | 0.013 |
| 35 | .0012 (6.9E-4) | .0040 (.0014) | .0052 (2.0E-3) | .0042 (.0018) | .0030 (5.0E-4) | .0015 (7.2E-4) | .0020 |
| 15 | 6.9E-4 (2.7E-4) | 6.3E-4 (.0001) | 9.5E-4 (1.8E-4) | 1.1E-3 (9E-5) | 9.0E-4 (1.4E-4) | 3.1E-5 (2.1E-5) | 4.8E-5 |

*Conductivities listed are averaged results (3 to 5 measurements) with the standard deviations in parentheses.

TABLE 4

Conductivity of copolyimides as a function of relative humidity, compared with Nafion ® and homopolymer.

| Relative Humidity (%) | Conductivity* (S/cm) | | | | | | | |
|---|---|---|---|---|---|---|---|---|
| | Nafion ® | Homo-polymer | R([2B]PP) 5[a] | R([2B]PP) 2.5[b] | R([2N]P) 5 | R([2N]P) 2.5 | RN5 | RN2.5 |
| 100 | 0.08 | 0.19 (0.07) | 0.22 (0.05) | 0.20 (0.01) | 0.23 | 0.25 | 0.24 (0) | 0.16 (0.05) |
| 75 | 0.030 | 0.018 (0.003) | 0.050 (0.01) | 0.051 (0.01) | 0.031 | 0.030 | 0.026 (0.006) | 0.040 (0.004) |
| 50 | 0.013 | 0.004 (—) | 0.010 (0) | 0.012 (0.006) | 0.009 | 0.008 | 0.009 (0.001) | 0.008 (0.001) |
| 35 | 2.0E-3 | 1.5E-3 (7.2E-4) | 4.4E-3 (0) | 3.1E-3 (3.0E-4) | 7.3E-3 | 2.6E-3 | 3.5E-3 (9.0E-4) | 3.8E-3 (6.0E-4) |
| 15 | 4.8E-5 | 3.1E-5 (2.1E-5) | 1.4E-3 (7.5E-5) | 9.0E-4 (8.7E-5) | 3.7E-4 | 1.2E-3 | 5.1E-4 (1.1E-4) | 5.2E-4 (1.0E-5) |

*Averaged data; the standard errors are shown within parentheses.
[a]same sample, three times over 7 days.
[b]two samples, three times in all.

TABLE 5

Conductivities of copolyimides with displacing comonomers as a function of relative humidity compared with homopolymer.

| Relative Humidity (%) | Conductivity (S/cm) | | | | | | | |
|---|---|---|---|---|---|---|---|---|
| | Homo-polymer | RN5 | RN10 | RN20 | R2,6-A5 | R2,6-A20 | Rdm-AP5 | Rdm-AP10 |
| 100 | 0.23 | 0.20 | 0.15 | 0.17 | 0.23 | 0.18 | 0.16 | 0.12 |
| 75 | 0.038 | 0.057 | 0.031 | 0.040 | 0.038 | 0.021 | 0.032 | 0.024 |
| 50 | 0.0093 | 0.015 | 0.011 | 0.010 | 0.0091 | 0.0072 | 0.012 | 0.01 |
| 35 | 2.6E-3 | 7.4E-3 | 3.5E-3 | 5.5E-3 | 4.1E-3 | 1.6E-3 | 4.3E-3 | 1.7E-3 |
| 15 | 2.9E-4 | 4.0E-4 | 1.2E-4 | 6.3E-4 | 6.6E-4 | 2.8E-4 | 3.1E-4 | 2.7E-4 |

In Table 5, set forth above, copolymide films were cast from DMSO in the acid form.

TABLE 6

Conductivity of random copolymers with FDA as a function of relative humidity, compared with Nafion ® and homopolymer.

| Relative Humidity (%) | Conductivity (S/cm) | | | | |
|---|---|---|---|---|---|
| | Nafion ® | Homo-polymer | RF5 | RF10 | RF20 |
| 100 | 0.08 | 0.18 | 0.153 | 0.25 | 0.14 |
| 75 | 0.030 | 0.019 | 0.071 | 0.034 | 0.059 |
| 50 | 0.013 | 0.0043 | 0.013 | 0.014 | 0.014 |
| 35 | 0.0020 | 0.0023 | 0.0031 | 0.0028 | 0.0043 |
| 15 | 4.8E-05 | 5.6E-05 | 6.5E-04 | 1.5E-04 | 3.0E-04 |

Figure 3:
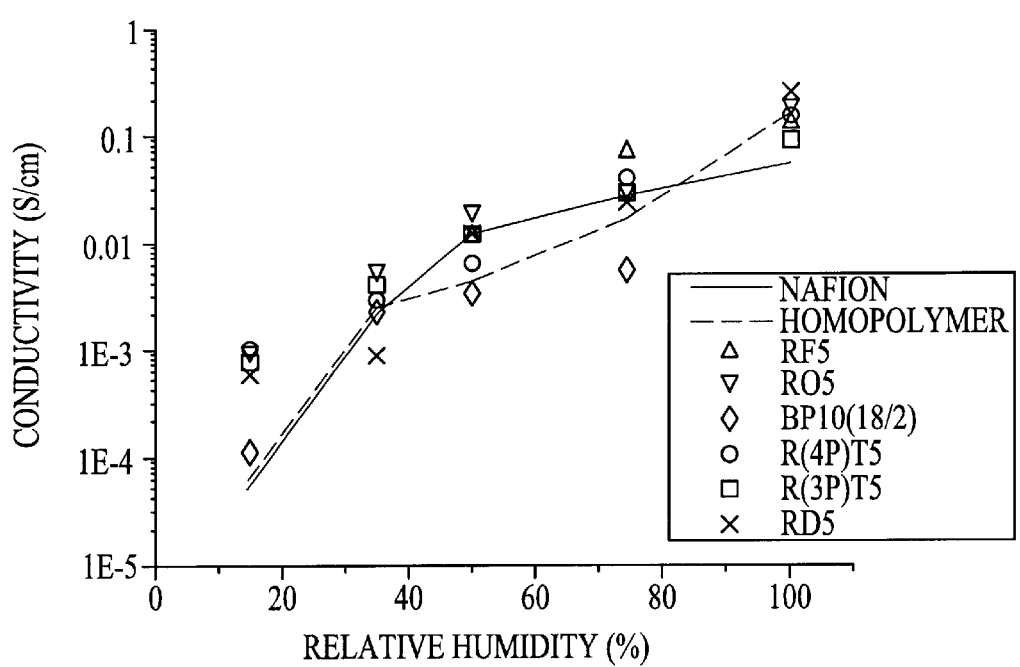
FIG. 3 is a graphical representation of data provided in Table 3 and compares the conductivity of selected polyimides to a corresponding homopolymer and Nafion® at selected relative humidities.
Figure 4:
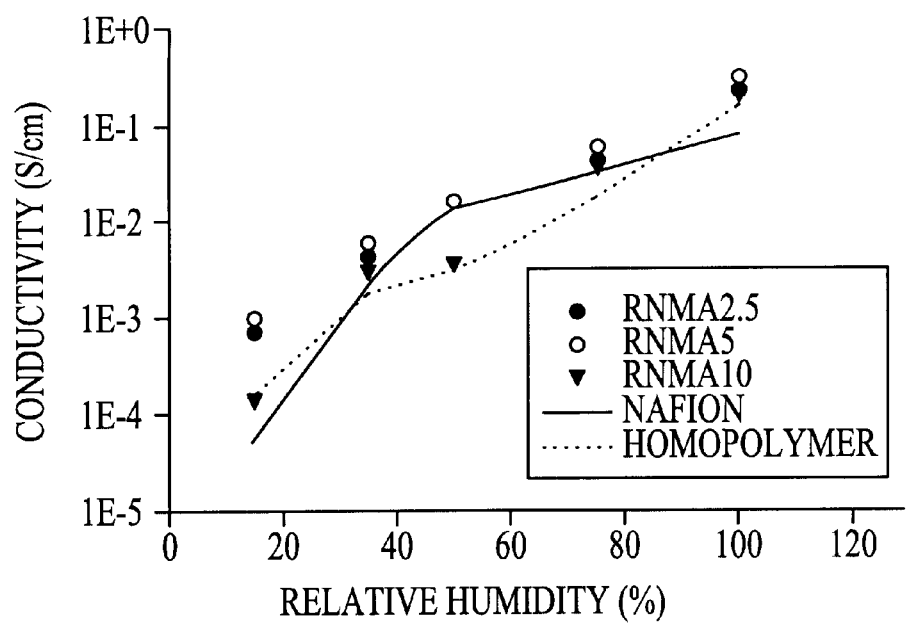
FIG. 4 compares the conductivity of RNMA polyimides, having selected mole fractions of comonomers, to the homopolymer and Nafion® at selected relative humidities.

Data provided in Tables 3 through 6 and FIGS. 3 and 4 demonstrate that polyimide polymers of the present invention exhibit conductivities comparable to or greater than both the homopolymer and Nafion® at relative humidities from 15 to 100%.

Tables 7 through 9 compare the conductivities of selected polyimides in which the mole fraction of comonomer (unit B) was varied. Polymers of the present invention were developed based on the discovery by the present inventors that a small amount of a bulky or angled comonomer incorporated into the polymer would sufficiently separate the chains, creating nanopores lined with sulfonic acid groups and, thus, lead to an increase in conductivity. An unexpected discovery was made in finding that the conductivity of present invention polyimides is greater when a relatively small mole percentage of comonomer is incorporated into the polyimide. Such a trend is evidenced, exceptions not withstanding, in Tables 7 through 9.

TABLE 7

Conductivities of copolyimides containing TAM.

| Relative Humidity (%) | Conductivity (S/cm) | | | | | |
|---|---|---|---|---|---|---|
| | RTAM1 | RTAM2 | RTAM3 | RTAM4 | RN20 TAM2.5 | RN40 TAM1 |
| 100 | 0.27 | 0.27 | 0.14 | 0.11 | 0.11 | 0.061 |
| 75 | 0.033 | 0.031 | 0.031 | 0.014 | 0.02 | 0.0090 |
| 50 | 9.0E-3 | 10E-3 | 8.4E-3 | 8.2E-3 | 5.5E-3 | 2.8E-3 |
| 35 | 1.1E-3 | 2.6E-3 | 1.7E-3 | 1.2E-3 | 1.4E-3 | 0.58E-3 |
| 15 | 2.2E-4 | 3.8E-4 | 1.8E-4 | 1.0E-4 | 4.4E-4 | 0.04-E-4 |

In Table 7, above, copolymide films were cast from DMSO in the acid form.

TABLE 8

Conductivities of copolyimides containing fluorinated comonomer.

| Relative Humidity (%) | Conductivity (S/cm) | | | |
|---|---|---|---|---|
| | RTFMB10 | RTFMB25 | RTFMB33 | RTFMB50 |
| 100 | 0.21 | 0.12 | 0.061 | 0.029 |
| 75 | 0.027 | 0.021 | 0.0093 | 0.0012 |
| 50 | 8.0E-3 | 5.0E-3 | 2.8E-3 | 0.11E-3 |
| 35 | 1.0E-3 | 1.1E-3 | 0.56E-3 | 0.0027E-3 |
| 15 | 11E-5 | 4.0E-5 | 1.3E-5 | — |

In Table 8, above, copolymide films were cast from DMSO in the acid form.

TFMB does not significantly increase chain separation. The very non-polar $CF_3$ groups of TFMB decrease the hot water solubility of the polymer, and thus, overall, provides an advantage over Nafion®. RTFMB10 exhibits slightly higher conductivities compared to homopolymer and Nafion®, while RTFMB25, RTFMB33, and RTFMB50 are lower.

TABLE 9

Conductivities of random copolymers with ODA at room temperature.

| Relative Humidity (%) | Conductivity (S/cm) | | |
|---|---|---|---|
| | RO5 | RO10 | RO20 |
| 100 | 0.21 | 0.16 | 0.16 |
| 75 | 0.030 | 0.085 | 0.026 |
| 50 | 0.02 | 0.0064 | 0.012 |
| 35 | 0.0065 | 0.0026 | 0.0046 |
| 15 | 7.4E-04 | 3.1E-4 | 2.9E-04 |

TABLE 10

Conductivities of copolymers with 10% FDA, as random copolymer and block copolymer.

| Relative Humidity (%) | Conductivity (S/cm) | |
|---|---|---|
| | RF10 | BF10(18/2) |
| 100 | 0.25 | 0.22 |
| 75 | 0.034 | 0.023 |
| 50 | 0.014 | 0.013 |

TABLE 10-continued

Conductivities of copolymers with 10% FDA, as random copolymer and block copolymer.

| Relative Humidity | Conductivity (S/cm) | |
|---|---|---|
| (%) | RF10 | BF10(18/2) |
| 35 | 0.0028 | — |
| 15 | 1.5E−4 | 2.5E−4 |

TABLE 11

Conductivities of copolymers with 20% FDA, as random copolymer and block copolymers with different block lengths.

| Relative Humidity | Conductivity (S/cm) | | |
|---|---|---|---|
| (%) | RF20 | BF20(8/2) | BF20(12/3) |
| 100 | 0.31 | 0.11 | 0.14 |
| 75 | 0.020 | 0.016 | 0.03 |
| 50 | 0.0074 | 0.0038 | 0.0063 |
| 35 | 0.0014 | 1E−3 | 0.004 |
| 15 | 4.6E−4 | 9.8E−5 | 1.9E−4 |

Figure 9:
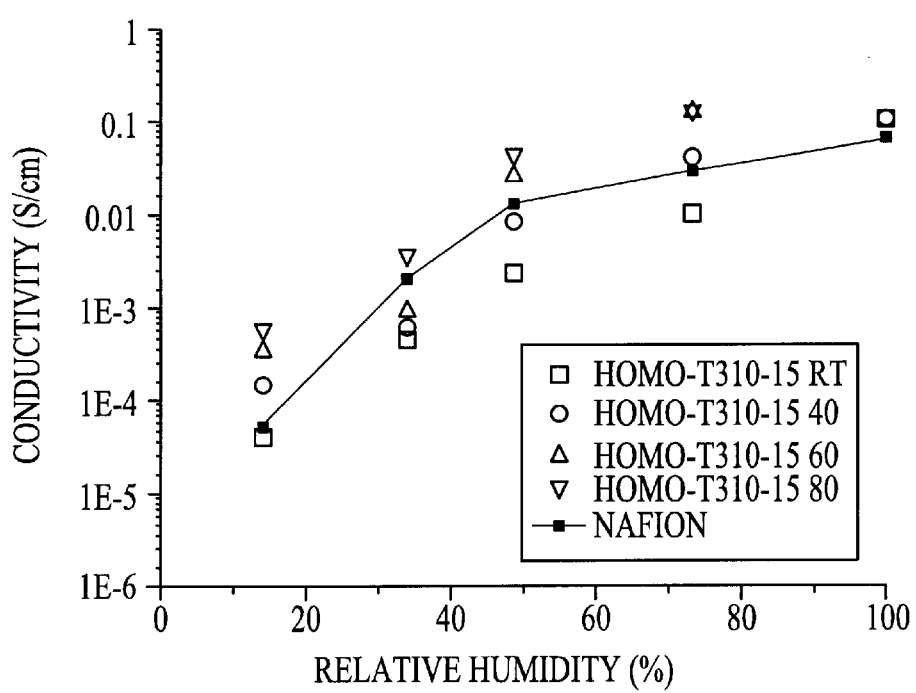
FIG. 9 is a graph of conductivity of heat treated homopolymer at different relative humidities compared with Nafion®.
Figure 10:
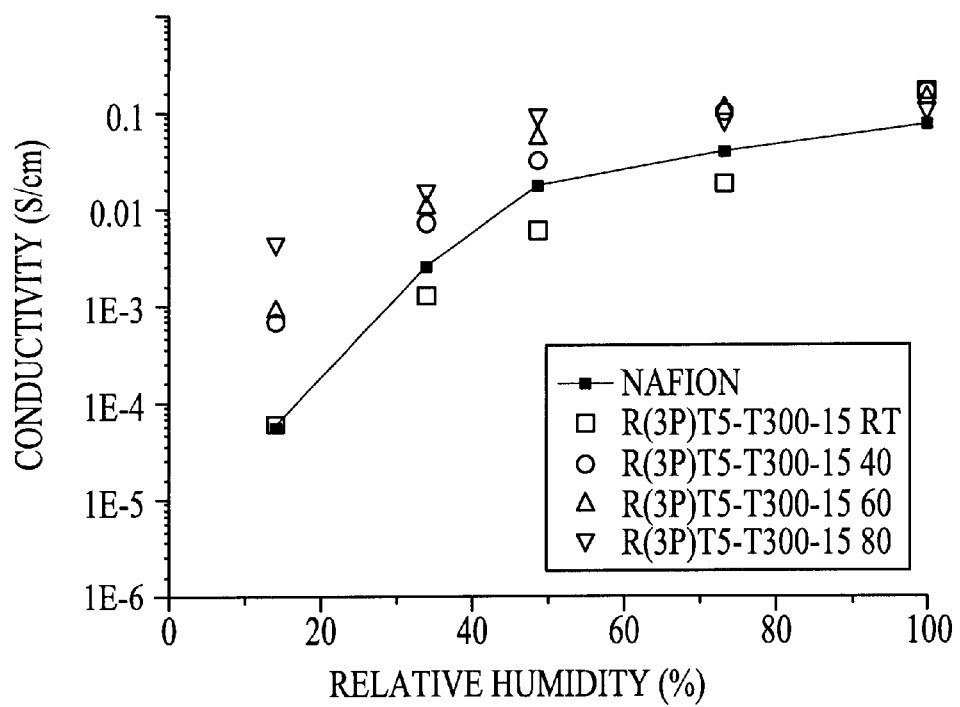
FIG. 10 is a graph of conductivity of heat treated R(3P)T5 at different relative humidities compared with Nafion®.

FIGS. 9 and 10 show the effect of relative humidity on conductivity for selected polyimide membranes. Polyimide membranes according to the present invention were heated at 290° C., 300° C. and 310° C. After heating to 290° C., membranes dissolved in hot water. Membranes heated to 300° C. and 310° C. were stable in hot water and so conductivities of such membranes were determined. Slight loss of conductivity was observed at room temperature. Polyimide membranes exhibited an increase in conductivity at elevated temperatures. The conductivities of homopolymer heat treated at 310° C. and R(3P)T5 polyimide membranes heat treated at 300° C. for 15 minutes were determined at temperatures ranging from room temperature to 80DC, and compared to the conductivity of Nafion® at room temperature. Both the homopolymer and R(3P)T5 membranes exhibited conductivity superior to room temperature Nafion® at temperatures exceeding 60° C.

Figure 5:
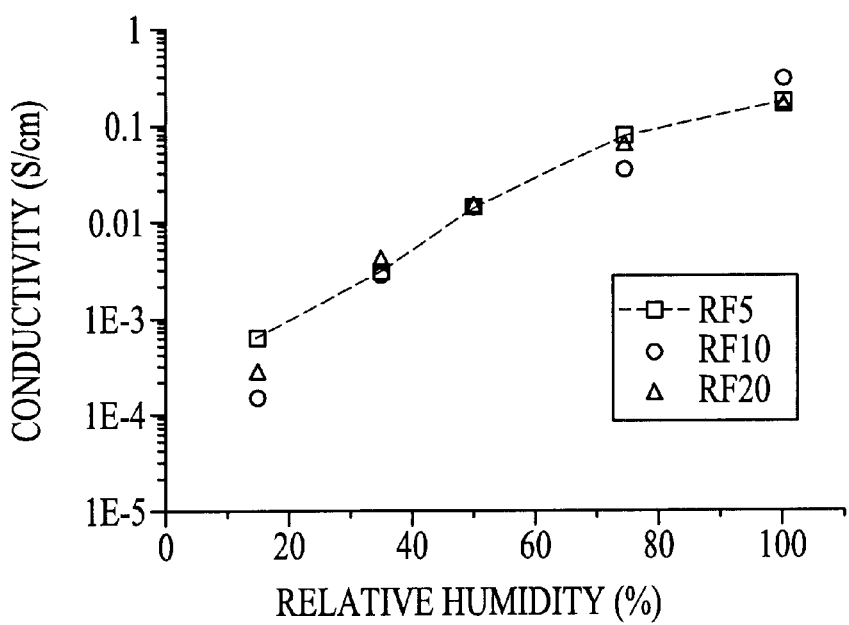
FIG. 5 compares the conductivity of RF5, RF10 and RF20 polyimides, having various mole fractions of comonomers, at selected relative humidities.
Figure 6:
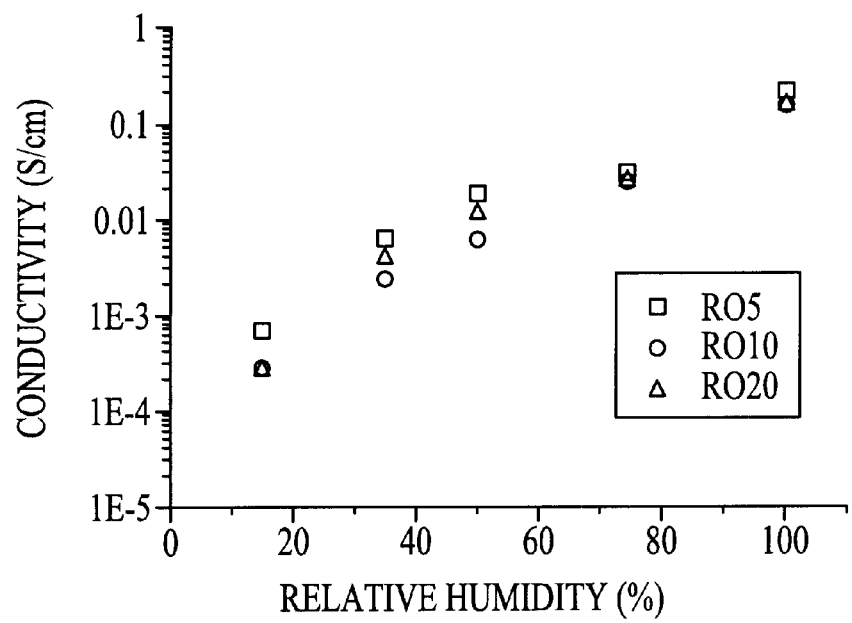
FIG. 6 is a graphical representation of data provided in Table 9 and compares conductivities of certain polyimides at selected relative humidities.
Figure 7:
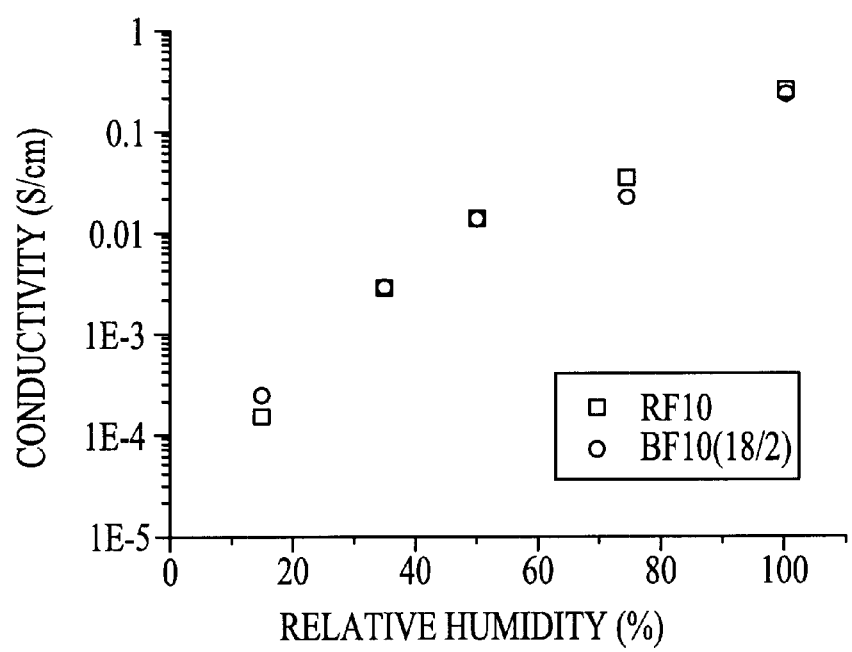
FIG. 7 is a graphical representation of data provided in Table 10 and compares conductivities of certain polyimides at selected relative humidities.
Figure 8:
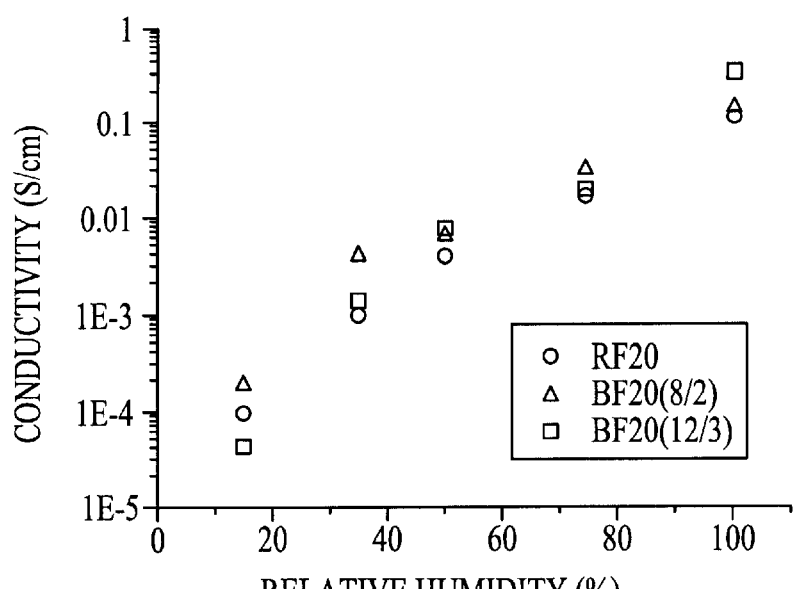
FIG. 8 is a graphical representation of data provided in Table 11 and compares conductivities of certain polyimides at selected relative humidities.

Exposed sulfonic acid groups readily adsorb and strongly retain water. Water uptake by the synthesized polyimides, as a function of relative humidity, was determined via a weighing procedure set forth as follows. Film samples were placed in weighing bottles and thoroughly dried under vacuum at 80° C. for 24 hours. After drying, film samples were weighed and then placed in one of several desiccators having a defined relative humidity using LiCl solutions. Samples were weighed daily until an equilibrium weight was achieved. Water uptake was determined at relative humidities of 100%, 75%, 50%, 35% and 15%. Tables 12 and 13 list water absorption data through a range of relative humidities for various polymers, obtained using the weighing method. The data from Tables 12 and 13, when viewed with conductivity data displayed in Table 3 and FIGS. 4 and 5, indicate that high water content correlates with high proton conductivity and vice-versa.

TABLE 12

Influence of relative humidity on the water uptake, shown as overall moles of water per sulfonic acid group.

| Relative Humidity | Moles of water per sulfonic acid group | | | | | |
|---|---|---|---|---|---|---|
| (%) | RD5 | RF5 | RO5 | R(3P)T5 | R(4P)T5 | Homo-polymer |
| 100 | 10.1 | 10.1 | 9.55 | 10.1 | 10.5 | 9.72 |
| 75 | 5.45 | 6.38 | 5.04 | 5.38 | 5.79 | 4.32 |
| 50 | 4.09 | 4.61 | 4.19 | 4.39 | 4.16 | 3.28 |
| 35 | 3.34 | 3.84 | 3.26 | 3.53 | 3.38 | 2.7 |
| 15 | 2.86 | 3.23 | 2.38 | 2.52 | 2.74 | 2.42 |

TABLE 13

Influence of relative humidity on the water uptake, shown as moles of water per sulfonic acid group.

| Relative Humidity | Moles of water per sulfonic acid group | | | | | | | |
|---|---|---|---|---|---|---|---|---|
| (%) | RF5 | RO5 | R(3P)T5 | R(4P)T5 | RNMA5 | RNMA2.5 | BP10(18/2) | Homopolymer |
| 100 | 10.1 | 9.55 | 10.1 | 10.5 | 10.3 | 10.4 | 9.22 | 9.72 |
| 75 | 6.38 | 5.04 | 5.38 | 5.79 | 6.9 | 6.9 | 4.45 | 4.32 |
| 50 | 4.61 | 4.19 | 4.39 | 4.16 | 5.5 | 5.5 | 4.16 | 3.28 |
| 35 | 3.84 | 3.26 | 3.53 | 3.38 | 4.3 | 4.3 | 2.24 | 2.70 |
| 15 | 3.23 | 2.38 | 2.52 | 2.74 | 2.9 | 2.9 | 1.60 | 2.42 |

Rigid rod polymers of the, present invention exhibit excellent water stability, an essential feature for polymer electrolyte membranes to be stable in a fuel cell environment. Table 14 demonstrates the water stability of selected present invention polymers compared to the homopolymer.

TABLE 14

Water resistance of polyimide membranes.

| Polymer | Water at 50° C. | Water at 90° C. | Boiling water (48 hour)* |
|---|---|---|---|
| Homopolymer | Dissolved at RT | — | — |
| RF5 | Dissolved after 2 hours at 25° C. | — | — |
| RO5, RO10, RF10 | Dissolved** | — | — |
| RF20, BF20(8/2) | Stable | Disintegrated | — |
| BP10(18/2) | Stable | Stable | Stable |
| R(3P)T5, R(4P)T5 | Stable | Stable | Stable |
| BF10(18/2), BF20(16/4) | Stable | Stable | Stable |
| PNHA2.5,5 and 10 | Stable | Stable | Stable |

TABLE 14-continued

Water resistance of polyimide membranes.

| Polymer | Water at 50° C. | Water at 90° C. | Boiling water (48 hour)* |
|---|---|---|---|
| PNMA2.5,5 and 10 | Stable | Stable | Stable |
| PNEA2.5,5 and 10 | Stable | Stable | Stable |

*Immersion in boiling water was subsequently extended to three weeks. Most films started to tear by that time.
**Films stable at room temperature.

When p-phenylene is the B monomer, the polymer is stable in water and exhibits good properties compared to Nafion® and homopolymer, but also exhibits decreased conductivity compared to Nafion®.

Table 15 compares the solubility in certain solvents, of selected polymers to that of the homopolymer. Ideally, polymers of the present invention should be insoluble in water and soluble in solvents such as dimethyl sulfoxide (DMSO), in order to be cast as films.

TABLE 15

Inherent Viscosities and Solubilities of Diaza Copolymers.

| Polymer | Intrinsic Viscosity (dL/g) | Water | m-cresol | NMP | DMSO | DMF |
|---|---|---|---|---|---|---|
| Homopolymer | 1.93 | + | ++ | + | ++ | ± |
| RNHA2.5 | 2.32 | – | + | + | + | + |
| RNHA5 | 2.51 | – | + | + | + | + |
| RNHA10 | 2.46 | – | + | + | + | + |
| RNMA2.5 | 2.25 | – | + | + | + | + |
| RNMA5 | 2.58 | – | + | + | + | + |
| RNMA10 | 2.67 | – | + | + | + | + |
| RNEA2.5 | 2.51 | – | ++ | + | + | + |
| RNEA5 | 2.76 | – | ++ | + | + | + |
| RNEA10 | 2.84 | – | ++ | + | + | + |

Notes:
Intrinsic viscosities were measured using 0.5% solutions in DMSO.
Solubility key: ++, soluble at room temperature; +, soluble in hot solvent, remains soluble when cold; +partially soluble after heating; –, insoluble.
Solvent Abbreviations: NMP, N-methylpyrrolidone; DMSO, dimethyl sulfoxide; DMF, N,N-dimethyl formamide.

Polymers of the present invention may also be made as salts, by converting the polymer to the acid form and mixing with a suitable counter ion. Salts play a role in improving water stability.

Table 16 lists the solubility of the 100% salt form of R(4P)T5 with different counter ions.

TABLE 16

Solubility of R(4P)T5 salts with different counter ions

| Counter Ions | Solvent | |
|---|---|---|
| | $H_2O$ | DMSO |
| TEA | – | + |
| $Li^+$ | + | + |
| $Na^+$ | + | + |
| $K^+$ | + | + |
| $Ba^{2+}$ | – | – |
| $Ca^{2+}$ | – | + |
| $Zn^{2+}$ | – | + |

Notes:
Solubility key: –, insoluble, +, soluble.

The criteria for a suitable salt to be used in preparing salt forms of the present invention polymers is that the salt should be insoluble in water and soluble in DMSO, to allow for film casting. However, TEA is not a suitable salt to be used under working fuel cell conditions, because it is susceptible to oxidation. $Ca^{2+}$ and $Zn^{2+}$ are two counter ions identified by the present inventors which meet that criteria. Membranes of R(4P)T5, cast containing 8 mole percent $Ca^{2+}$ did not dissolve in water but tore after two hours. In contrast, a membrane film of R(4P)T5 containing 15 mole percent $Zn^{2+}$ was stable in water and tore after eight hours.

Water stability of copolyimides containing displacing comonomers, TAM or TFMB was tested using deionized water at 90° C. Copolyimides modified with displacing comonomers or TAM dissolved in water at elevated temperature. As the mole percentage of the comonomer increased, water stability of the copolyimides improved. For example, BN5 (38/2), B2,6-A5 (38/2) and BDm-AP5 (38/2) dissolved in 30 minutes in water at 90° C. BN10 (18/2), BDm-AP10 (18/2), RTAM1 and RTAM2 are stable for one to two hours at 90° C. and BN20 (8/2), B2, 6-A-20 (8/2), RTAM3, RTAM4, RN20TAM2.5 and RN40TAM1 are stable for three to seven hours at 90° C.

Copolyimides incorporating the non-polar comonomer TFMB are stable when smaller mole percentages of the comonomer are used. Samples of RTFMB10 and RTFMB25 are stable for six to fourteen hours, whereas RTFMB33 and RTFMB5 are not soluble in water at 90° C.

High temperature treatments of polyimide membranes affect water stability. Homopolymer and R(3P)T5 films treated at 300–310° C. under $N_2$ for 10 to 15 minutes are stable in boiling water for more than five days. Treatment of membranes below 290° C. yields films that slowly dissolve in hot water.

Casting methods also play a role in water stability, in that the casting method affects the physical properties of polyimide films. Homopolymer films cast in the salt form, usually from m-cresol, and then acidified, typically instantly swell about ten fold in water at room temperature and then gradually dissolve. Films cast in the acid form, from DMSO, are completely stable in water at room temperature and gradually dissolve at 50° C. to 80° C. without much swelling.

While not to be bound by hypothesis, it is believed that films cast in the salt form may be less dense after acidifying compared to films cast in the acid form and, therefore, can easily interact with water at any temperature and dissolve. Films cast in the acid form may crystallize to some extent. The crystallinity is not destroyed by water at room temperature and protects the film from extreme swelling and dissolution. As temperature increases the crystalline character is slowly destroyed and the film begins to dissolve.

Table 17 compares the conductivities of a salt form of R(4P)T5 having 15 mole percent $Zn^{2+}$ (R(4P)T5-Zn-15), to Nafion®, homopolymer, and R(3P)T5. The salt form R(4P)T5-Zn-15 exhibits conductivities lower than that of its starting form, i.e., R(4P)T5 containing no salt, over a range of relative humidities. However, in general, the salt form exhibits conductivities comparable to those of the homopolymer and Nafion®.

polymer electrolyte membranes in a fuel cell. Fuel cells are described in greater detail in "Fuel Cells," Kirk-Othmer Encyclopedia of Technology, 4th Edition, Vol. 11, 1098–1121 (1995), "Polymer electrolyte fuel cells: a, review of recent developments," *Journal of Power Sources*, 51 (1994) 129–144; and "On solid polymer fuel cells," *J.*

TABLE 17

Polyimide conductivities at room temperature, with Nafion ® as comparison.

| Relative Humidity (%) | Conductivity (S/cm) | | | | | | |
|---|---|---|---|---|---|---|---|
| | Nafion ® | Homo-polymer*[#,c] | R(3P)T5*[#,c] | R(4P)T5*[#,c] | Homo-T310-10[#,a] | R(3P)T5-T300-15[#,b] | R(4P)T5-Zn-15 |
| 100 | 0.08 | 0.25 (0.07) | 0.18 (0.05) | 0.18 (0.002) | 0.07 (0.03) | 0.12 (0) | 0.14 |
| 75 | 0.03 | 0.018 (1.0E-3) | 0.031 (0.002) | 0.038 (0.005) | 8.0E-3 (2.0E-3) | 0.014 (6.1E-4) | 0.024 |
| 50 | 0.013 | 5.0E-3 (5.0E-4) | 0.011 (0.001) | 5.8E-3 (3.5E-4) | 1.8E-3 (3.8E-4) | 4.3E-3 (5.7E-5) | 4.9E-3 |
| 35 | 2.0E-3 | 1.8E-3 (3.0E-4) | 3.8E-3 (3.6E-4) | 2.8E-3 (6.0E-4) | 3.8E-4 (6.2E-5) | 1.0E-3 (7.0E-5) | 9.1E-4 |
| 15 | 4.8E-5 | 1.6E-4 (7.5E-5) | 1.0E-3 (6.0E-4) | 8.0E-4 (1.6E-4) | 2.6E-5 (1.6E-5) | 5.03-5 (0) | 6.1E-5 |

*Averaged data from at least three samples and more than five measurements, standard deviation shown in parentheses.
Cast in salt form from m-cresol solution, transformed to acid form.
aHomopolymer, after heat treatment at 310° C., $N_2$ for 15 min, two samples, three measurements.
bR(3P)T5, after heat treatment at 300° C., $N_2$ for 15 min, same sample, three measurements.
cData from polymers before treatment.

Polymers of the present invention also demonstrate low methanol permeability. Methanol permeability is measured using a vapor permeation measurement. A membrane is used to separate two chambers, one chamber containing saturated methanol vapor at room temperature, the second chamber remains empty. Methanol flux through the membrane is measured by evacuating the second (empty) chamber and recording the pressure rise in the second chamber, as methanol permeates through the membrane. Under the above test conditions, the methanol permeability of the RF5 membrane was one-third of the methanol permeability of a Nafion® membrane.

Table 18 compares mechanical properties of various diaza polymer films to the corresponding homopolymer. Polymer films formed from polymers containing linear, bulky, comonomers, such as NHA, or NEA, exhibit mechanical properties comparable to or greater than the homopolymer.

TABLE 18

Mechanical Properties of Diaza Polymer Films

| Polymer | Modulus (GPa) | Stress at Break (MPa) | Strain at Break (mm/mm) |
|---|---|---|---|
| Homopolymer | 1.74 | 124 | 0.16 |
| RNHA2.5 | 1.78 | 126 | 0.18 |
| RNHA5 | 1.85 | 131 | 0.17 |
| RNHA10 | 1.86 | 135 | 0.17 |
| RNMA2.5 | 1.84 | 127 | 0.17 |
| RNMA5 | 1.84 | 130 | 0.25 |
| RNMA10 | 1.85 | 131 | 0.21 |
| RNEA2.5 | 1.83 | 127 | 0.17 |
| RNEA5 | 1.83 | 126 | 0.19 |
| RNEA10 | 1.83 | 124 | 0.22 |

C. Applications

The features and characteristics of rigid rod polyimides of the present invention make them especially suitable as

*Electroanal. Chem.*, 357 (1993) 237–250, all of which are incorporated herein by reference.

The present invention also provides membranes or thin layers comprising the previously described preferred embodiment polymers defined via Structures I and II. In a most preferred embodiment, the membranes preferably have a thickness from about 1 to about 20 mils and most preferably from about 2 to about 10 mils. It will be understood that the present invention membranes may be formed, preferably by casting methods, in a wide range of thicknesses and proportions.

A fuel cell, in a simplified-arrangement, comprises an anode, a cathode and an electrolyte membrane disposed between the anode and the cathode. Hydronium ions, generated by the anodic reaction, cross the membranes and react with an oxidizer, typically oxygen.

A preferred embodiment fuel cell according to the present invention utilizes polymers described herein as the electrolyte membrane separating the anode and the cathode. Most preferably, the present invention fuel cell utilizes membranes comprising polymers described herein and having Structures according to I or II.

Figure 11:
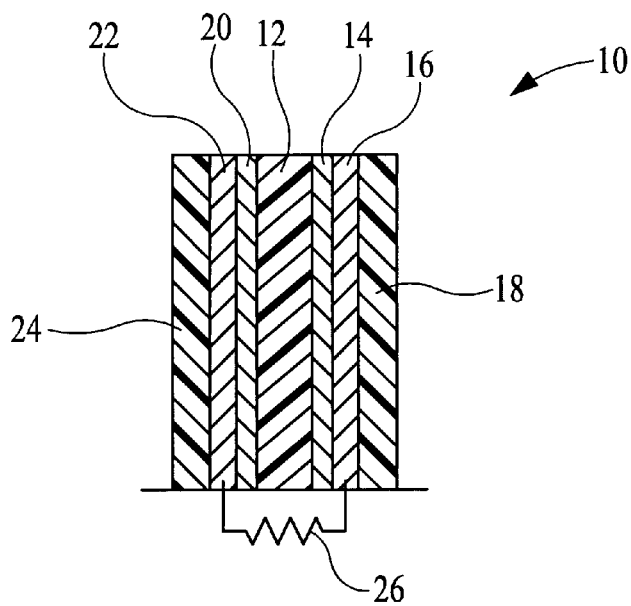
FIG. 11 is a schematic representation of a fuel cell utilizing a polymer electrolyte membrane according to the present invention.

FIG. 11 is a schematic of a preferred embodiment $H_2/O_2$ fuel cell unit 10 in accordance with the present invention. Hydrogen is fed into a fuel manifold 24, where it reacts with an electrode catalyst 20 to form protons. Electrons formed by the interaction of hydrogen and the catalyst electrode are collected by a hydrogen current collector 22 and subsequently fed into an external electrical load 26. Protons are absorbed by a conducting polymer electrolyte membrane 12. The membrane 12 preferably comprises a polymer as described herein having Structure I or II. Oxygen is fed into an oxidant manifold 18, where it reacts with the catalyst in the oxygen electrode and electrons returning from the external electrical load 26 through an oxygen current collector 16. Oxygen radicals are formed within the catalyst electrode 14.

Protons from the conducting membrane combine with oxygen radicals forming water in the oxygen electrode, thus, completing the electrochemical circuit.

The foregoing description is, at present, considered to be the preferred embodiments of the present invention. However, it is contemplated that various changes and modifications apparent to those skilled in the art, may be made without departing from the present invention. Therefore, the foregoing description is intended to cover all such changes and modifications encompassed within the spirit and scope of the present invention, including all equivalent aspects.

What is claimed:

1. A rigid rod ion conducting copolymer comprising:
   a non-polar first monomer capable of binding a diamine;
   a diamine second monomer having sulfonic acid groups; and
   a third monomer selected from the group consisting of diamine monomers, dianhydride monomers, and combinations thereof, the third monomer containing bulky, displacing or angled constituents, the third monomer capable of reacting with the first or second monomer;
   wherein the rigid rod ion conducting copolymer exhibits liquid crystal characteristics when in a solid form.

2. The rigid rod ion conducting copolymer of claim 1 wherein the first monomer is a dianhydride.

3. The rigid rod ion conducting copolymer of claim 2 wherein the first monomer is naphthalene tetracarboxy dianhydride.

4. The rigid rod ion conducting copolymer of claim 2 wherein the first monomer is perylene tetracarboxy dianhydride.

5. The rigid rod ion conducting copolymer of claim 2 wherein the first monomer is 1,4,5,8-tetracarboxy naphthalene dianhydride (TCND).

6. The rigid rod ion conducting copolymer of claim 1 wherein the second monomer is benzidene 2,2'-disulfonic acid (DAPS).

7. The rigid rod ion conducting copolymer of claim 1 wherein the copolymer has an intrinsic viscosity of from about 1.0 to about 20.0 dL/g.

8. The rigid rod ion conducting copolymer of claim 7 wherein the copolymer has an intrinsic viscosity of from about 2.0 to about 20.0 dL/g.

9. The rigid rod ion conducting copolymer of claim 1 wherein the third monomer contains bulky constituents.

10. The rigid rod ion conducting copolymer of claim 9 wherein the third monomer is selected from the group consisting of 1,4-bis(4-aminophenyl)-2,3,5-triphenyl benzene ((3P) TDA); 1,4-bis(4-aminophenyl)-2,3,5,6-tetraphenyl benzene ((4P)TDA); 2,2'-dibenzoyl-benzidine (DBB); 1,4 bis-(4-aminophenyl)-2,3 diphenyl-5,6-diphenyl benzene (DBPDPDA); 1,4-bis-(4-aminophenyl)-2,3,-di(2-naphthyl)-5,6-diphenyl benzene (DNDPDA); 1,1'-bis-(4-aminophenylene)-4,4'-(1,4-phenylene) bis-(2,6-diphenyl pyridinium tetrafluoroborate); 1,1'-bis-(4-aminophenylene)-4,4'-(1,4-phenylene) bis-(2,6-bis(4-methyl phenylene) pyridinium tetrafluoroborate); 1,1'-bis-(4-aminophenylene)-4,4'-(1,4-phenylene) bis-(2,6-bis(4-ethoxy phenylene) pyridinium tetrafluoroborate); 2',6",3',5'" tetra (R-phenyl) 4,1""-diaza-pentaphenylene diamine (NHA [R=H]; NMA [R=CH₃], NEA [R=ethoxy]);3,8-diamino-6-phenylphenanthridine (DAPP) and combinations thereof.

11. The rigid rod ion conducting copolymer of claim 1 wherein the third monomer contains displacing constituents.

12. The rigid rod ion conducting copolymer of claim 11 wherein the third monomer is selected from the group consisting of 1,5-diaminonaphthalene (1,5-DAN); 2,6-diaminoanthraquinone (2,6-DAA); 1,5-diaminoanthraquinone (1,5-DAA); Dm-APNTCDI; and combinations thereof.

13. The rigid rod ion conducting copolymer of claim 1 wherein the third monomer contains angled constituents.

14. The rigid rod ion conducting copolymer of claim 13 wherein the third monomer is selected from the group consisting of 4,4'-(9 fluorenyl)dianiline (FDA); 4,4'-oxydianiline (ODA); and combinations thereof.

15. A polymer having Structure II as follows:

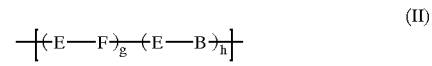

(II)

wherein E is a dianhydride, F is a sulfonic acid containing diamine, B is a second diamine, the molar ratio of g/(g+h) is within the range of from about 99 mole percent to about 50 mole percent and the molar ratio of h/(g+h) is within the range of from about 1 mole percent to about 50 mole percent.

16. The polymer of claim 15 wherein E is naphthalene tetracarboxy dianhydride.

17. The polymer of claim 15 wherein E is perylene tetracarboxy dianhydride.

18. The polymer of claim 15 wherein E is 1,4,5,8-tetracarboxy naphthalene dianhydride (TCND).

19. The polymer of claim 15 wherein F is benzidene 2,2'-disulfonic acid (DAPS).

20. The polymer of claim 15 wherein B is s elected from the group consisting of 1,4-p-phenylene diamine (PDA); 4,4'-(9 fluorenyl)dianiline (FDA); 4,4'-oxydianiline (ODA); 1,4-bis(4-aminophenyl)-2,3,5-triphenyl benzene ((3P) TDA); 1,4-bis(4-aminophenyl)-2,3,5,6-tetraphenyl benzene ((4P)TDA); 2,2'-dibenzoyl-benzidine (DBB); 1,4 bis-(4-aminophenyl)-2,3 diphenyl-5,6-diphenyl benzene (DBPDPDA); 1,4-bis-(4-aminophenyl)-2,3,-di(2-naphthyl)-5,6-diphenyl benzene (DNDPDA); 1,1'-bis-(4-aminophenylene)-4,4'-(1,4-phenylene) bis-(2,6-diphenyl pyridinium tetrafluoroborate); 1,1'-bis-(4-aminophenylene)-4,4'-(1,4-phenylene) bis-2,6-bis(4-methyl phenylene) pyridinium tetrafluoroborate); 1,1'-bis-(4-aminophenylene)-4,4'-(1,4-phenylene) bis-(2,6-bis(4-ethoxy phenlyene) pyridinium tetrafluoroborate); 2',6",3',5'" tetra (R-phenyl) 4,1""-diaza-pentaphenylene diamine (NHA [R=H]; NMA [R=CH₃], NEA [R=ethoxy]); 1,5-diaminonaphthalene (1,5-DAN); 2,6-diaminoanthraquinone (2,6-DAA); 1,5-diaminoanthraquinone (1,5-DAA); Dm-APNTCDI; tris(4-aminophenyl)methanol (TAM); and 2,2'-bis(trifluoro methyl) benzidene (TFMB); 3,8-diamino-6-phenylphenanthridine (DAPP); and combinations thereof.

21. The polymer of claim 15 wherein B is selected from the group consisting of

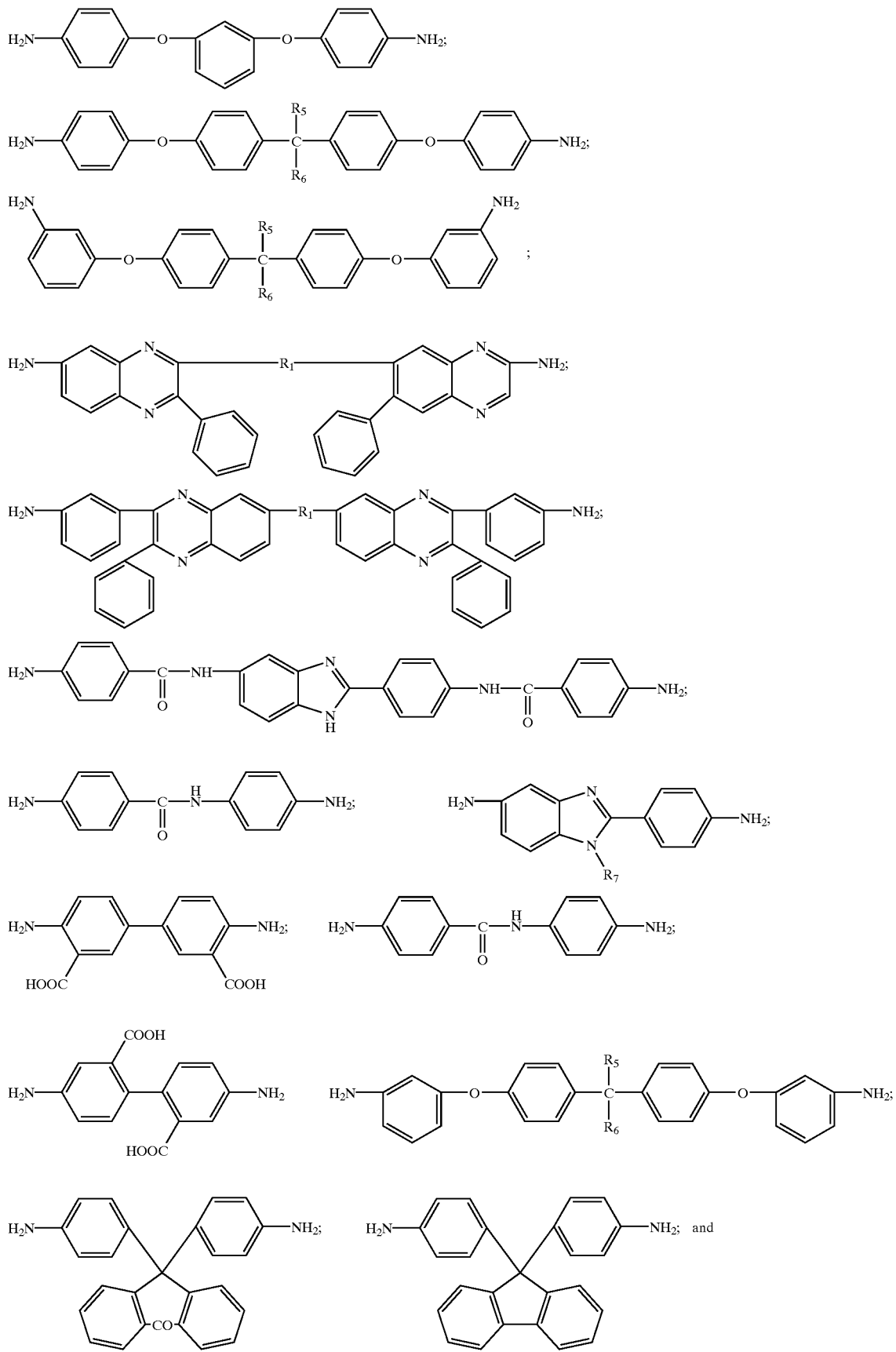

-continued

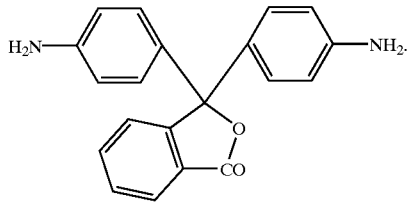

where $R_1$ is:

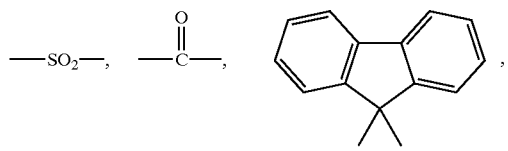

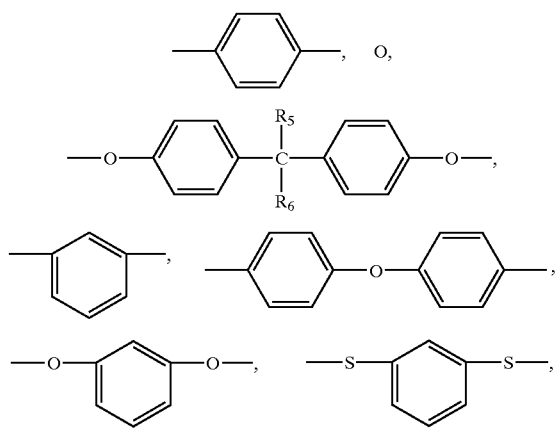

-continued

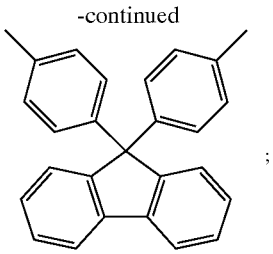

where $R_2$ is:

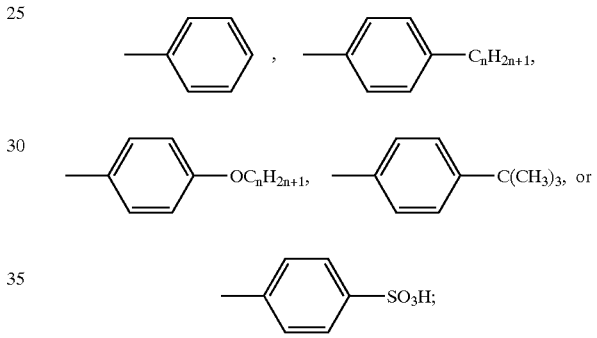

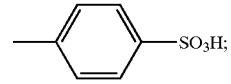

wherein $R_3$ and $R_4$ are:

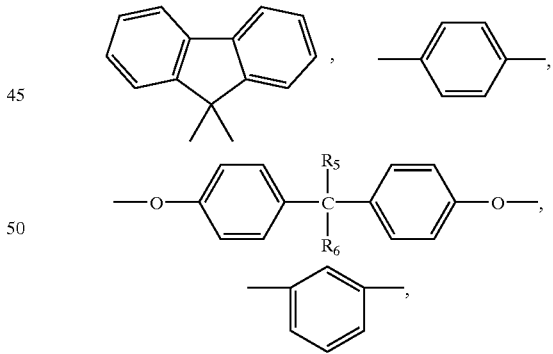

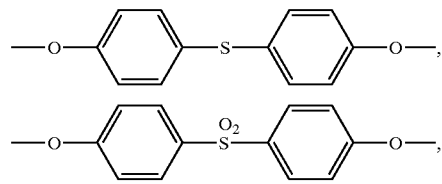

and where $R_5$, and $R_6$, and $R_7$ are hydrogen, trifluoro methyl, alkyl groups having from 1 to about 8 carbon atoms, or an aromatic structure.

22. The polymer of claim 15 wherein the polymer has an intrinsic viscosity of from about 1.0 to about 20.0 dL/g.

23. The polymer of claim 22 wherein the polymer has an intrinsic viscosity of from about 2.0 to about 20.0 dL/g.

24. The polymer of claim 15 wherein the molar ratio of g/(g+h) is within the range of from about 98 mole percent to about 80 mole percent.

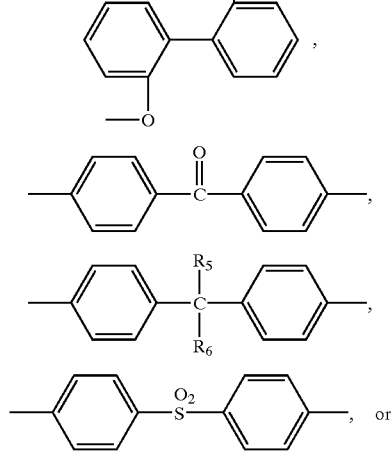

25. The polymer of claim 24 wherein the molar ratio of g/(g+h) is within the range of from about 97.5 mole percent to about 90 mole percent.

26. The polymer of claim 15 wherein the molar ratio of h/(g+h) is within the range of from about 2 mole percent to about 20 mole percent.

27. The polymer of claim 26 wherein the molar ratio of h/(g+h) is within the range of from about 2.5 mole percent to about 10 mole percent.

28. The polymer of claim 15 wherein B contains bulky constituents.

29. The polymer of claim 28 wherein B is selected from the group consisting of 1,4-bis(4-aminophenyl)-2,3,5-triphenyl benzene ((3P)TDA); 1,4-bis (4-aminophenyl)-2,3,5,6-tetraphenyl benzene ((4P)TDA); 2,2'-dibenzoyl-benzidine (DBB; 1,4 bis-(4-aminophenyl)-2,3 diphenyl-5,6-diphenyl benzene (DBPDPDA); 1,4-bis-(4-aminophenyl)-2,3, -di(2-naphthyl)-5,6-diphenyl benzene (DNDPDA); 1,1'-bis-(4-aminophenylene)-4,4'-(1,4-phenylene) bis-(2,6-diphenyl pyridinium tetrafluoroborate); 1,1'-bis-(4-aminophenylene)-4,4'-(1,4-phenylene)bis-(2,6-bis(4-methyl phenylene)pyridinium tetrafluoroborate); 1,1'-bis-(4-aminophenylene)-4,4'-(1,4-phenylene) bis-(2,6-bis(4-ethoxy phenlyene)pyridinium tetrafluoroborate); 2',6',3", 5'"tetra(R-phenyl) 4,1""-diaza-pentaphenylene diamine (NHA [R=H]; NMA [R=CH₃], NEA [R=ethoxy]); 3,8-diamino-6-phenylphenanthridine (DAPP); and combinations thereof.

30. The polymer of claim 15 wherein B contains displacing constituents.

31. The polymer of claim 30 wherein B is-selected from the group consisting of 1,5-diaminonaphthalene (1,5-DAN); 2,6-diaminoanthraquinone (2,6-DAA); 1,5-diaminoanthraquinone (1,5-DAA); Dm-APNTCDI; and combinations thereof.

32. The polymer of claim 15 wherein B contains angled constituents.

33. The polymer of claim 32 wherein B is selected from the group consisting of 4,4'-(9 fluorenyl) dianiline (FDA); 4,4'-oxydianiline (ODA); and combinations thereof.

34. A polymer having Structure II as follows:

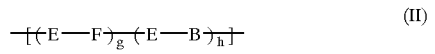

(II)

wherein E is a sulfonic acid containing diamine, F is a dianhydride, B is a second dianhydride, the molar ratio of g/(g+h) is within the range of from about 99 mole percent to about 50 mole percent and the molar ratio of h/(g+h) is within the range of from about 1 mole percent to about 50 mole percent.

35. The polymer of claim 34 wherein B is selected from the group consisting of

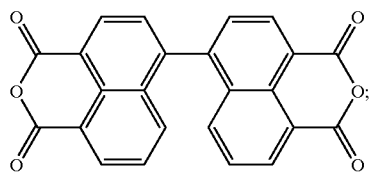

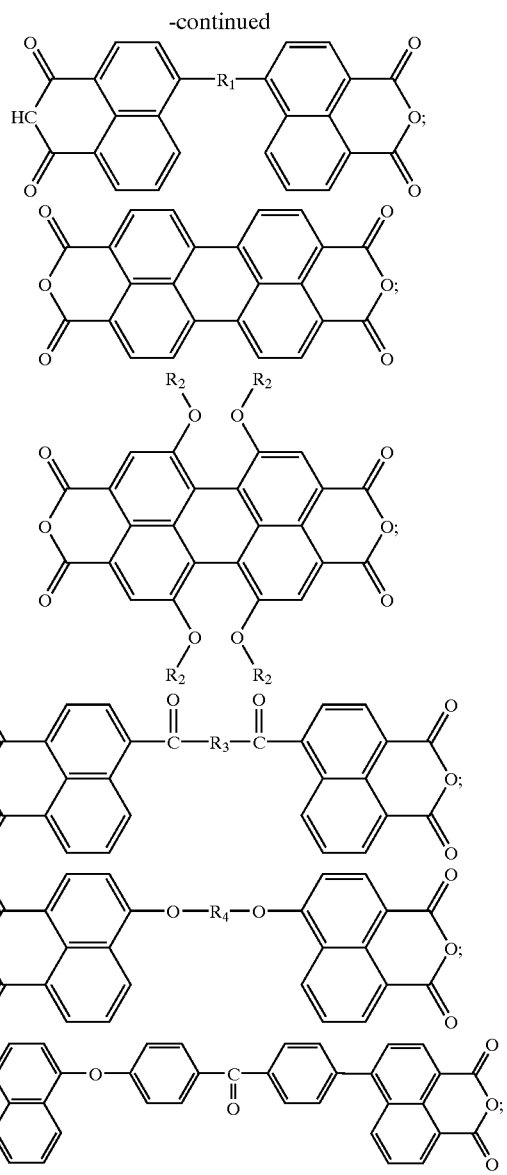

wherein $R_1$ is:

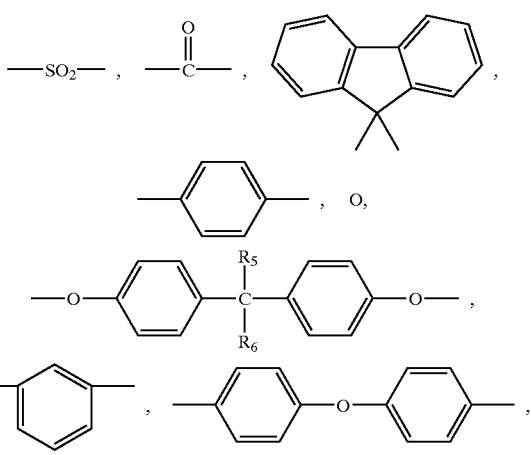

-continued

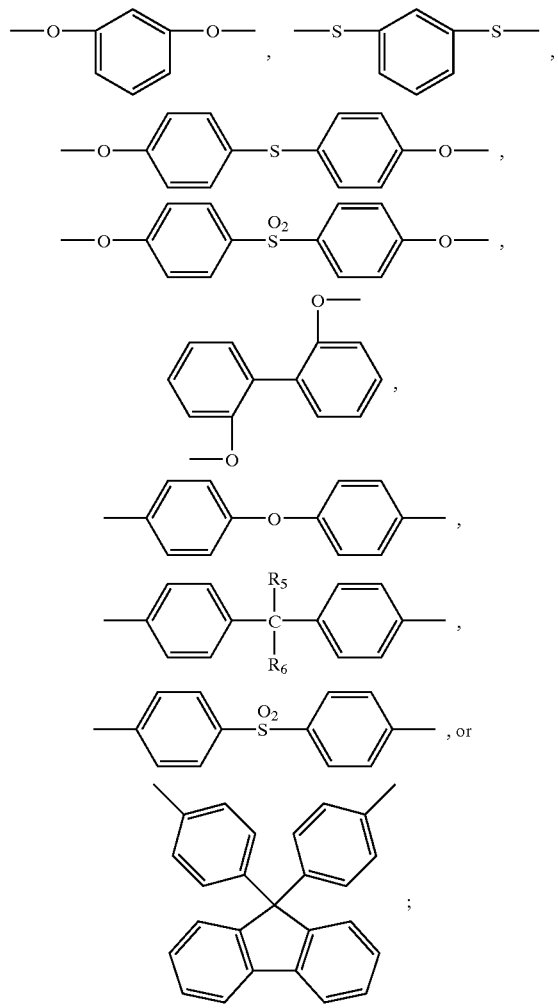

wherein $R_2$ is:

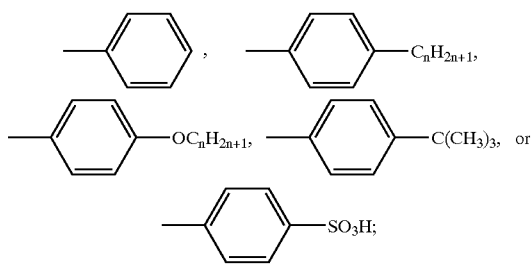

wherein $R_3$ and $R_4$ are:

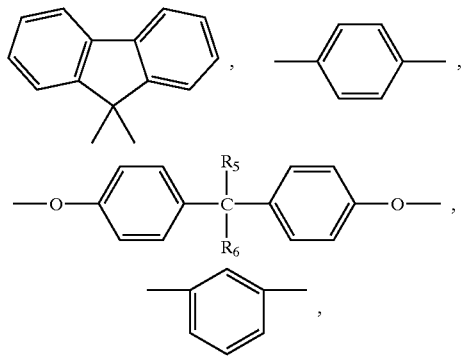

and wherein $R_5$ and $R_6$ are hydrogen, trifluoro methyl, alkyl groups having from 1 to about 8 carbon atoms, or an aromatic structure.

36. The polymer of claim 34 wherein F is naphthalene tetracarboxy dianhydride.

37. The polymer of claim 34 wherein F is perylene tetracarboxy dianhydride.

38. The polymer of claim 34 wherein F is 1,4,5,8-tetracarboxy naphthalene dianhydride (TCND).

39. The polymer of claim 34 wherein E is benzidene 2,2'-disulfonic acid (DAPS).

40. The polymer of claim 34 wherein the polymer has an intrinsic viscosity of from about 1.0 to about 20.0 dL/g.

41. The polymer of claim 40 wherein the polymer has an intrinsic viscosity of from about 2.0 to about 20.0 dL/g.

42. The polymer of claim 34 wherein the molar ratio of g/(g+h) is within the range of from about 98 mole percent to about 80 mole percent.

43. The polymer of claim 42 wherein the molar ratio of g/(g+h) is within the range of from about 97.5 mole percent to about 90 mole percent.

44. The polymer of claim 34 wherein the molar ratio of h/(g+h) is within the range of from about 2 mole percent to about 90 mole percent.

45. The polymer of claim 44 wherein the molar ratio of h/(g+h) is within the range of from about 2.5 mole percent to about 10 mole percent.

46. A polymer for use as a membrane in a fuel cell, the polymer having Structure I as follows:

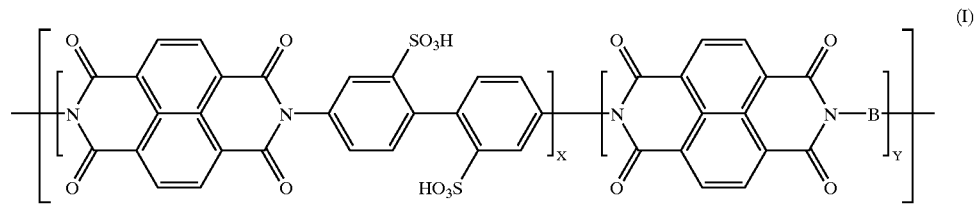

wherein B is a diamine, and the molar ratio of X to Y is from about 0.01 to about 0.5.

47. The polymer of claim 45 wherein B is selected from the group consisting of 1,4-p-phenylene diamine (PDA); 4,4'-(9 fluorenyl)dianiline (FDA); 4,4'-oxydianiline (ODA); 1,4-bis(4-aminophenyl)-2,3,5-triphenyl benzene ((3P)TDA); 1,4-bis(4-aminophenyl)-2,3,5,6-tetraphenyl benzene ((4P)TDA); 2,2'-dibenzoyl-benzidine (DBB); 1,4 bis-(4-aminophenyl)-2,3 diphenyl-5,6-diphenyl benzene (DBPDPDA); 1,4-bis-(4-aminophenyl)-2,3,-di(2-naphthyl)-5,6-diphenyl benzene (DNDPDA); 1,1'-bis-(4-aminophenylene)-4,4'-(1,4-phenylene) bis-(2,6-diphenyl pyridinium tetrafluoroborate); 1,1'-bis-(4-aminophenylene)-4,4'-(1,4-phenylene) bis-(2,6-bis(4-methyl phenylene) pyridinium tetrafluoroborate); 1,1'-bis-(4-aminophenylene)-4,4'-(1,4-phenylene) bis-(2,6-bis(4-ethoxy phenlyene) pyridinium tetrafluoroborate); 2',6',3'',5'''tetra (R-phenyl) 4,1''''-diaza-pentaphenylene diamine (NHA [R=H]; NMA [R=CH₃], NEA [R=ethoxy]); 1,5-diaminonaphthalene (1,5-DAN); 2,6-diaminoanthraquinone (2,6-DAA); 1,5-diaminoanthraquinone (1,5-DAA); Dm-APNTCDI; tris(4-aminophenyl)methanol (TAM); and 2,2'-bis(trifluoro methyl)benzidene (TFMB).

48. The polymer of claim 46 wherein B is selected from the group consisting of

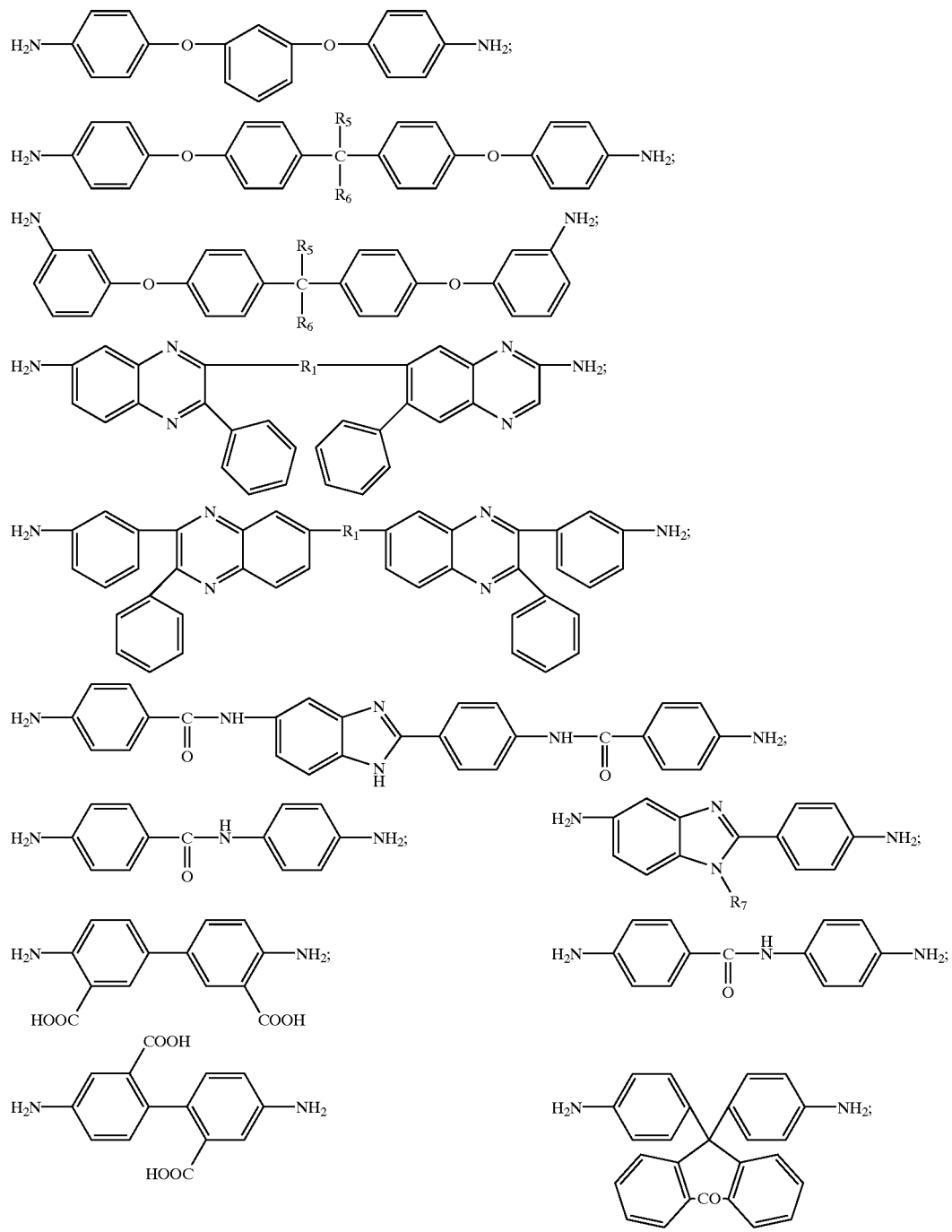

-continued
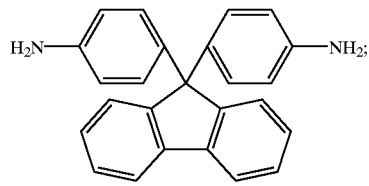 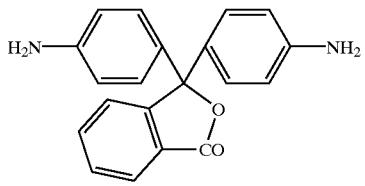
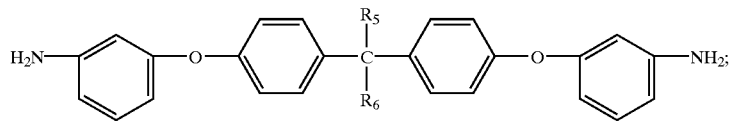
wherein $R_1$ is
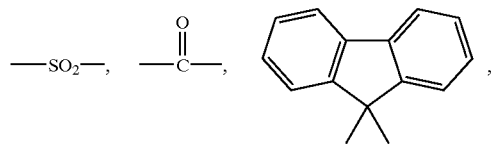
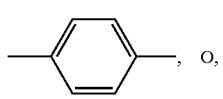
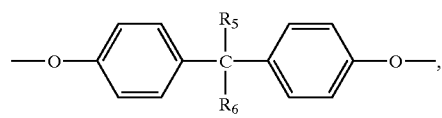
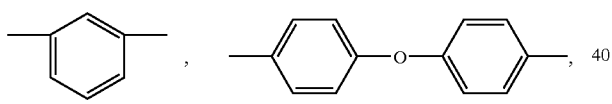
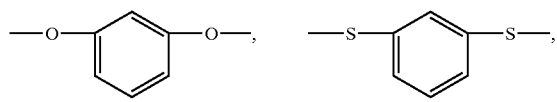
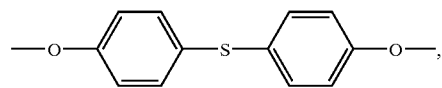
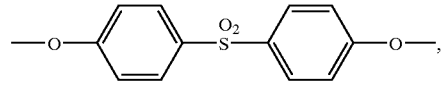
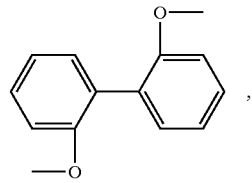
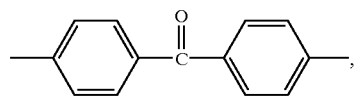
-continued
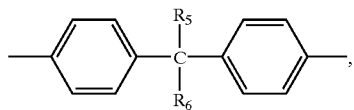
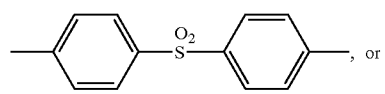, or
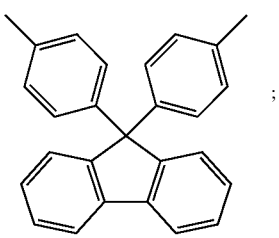;
where $R_2$ is:
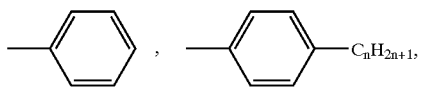
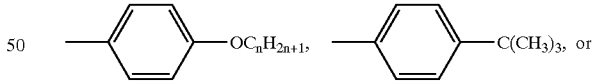, or
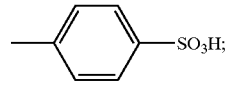;
wherein $R_3$ and $R_4$ are:
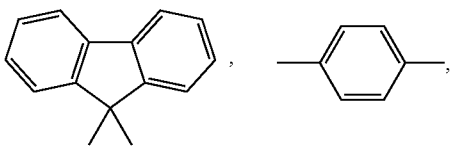

-continued

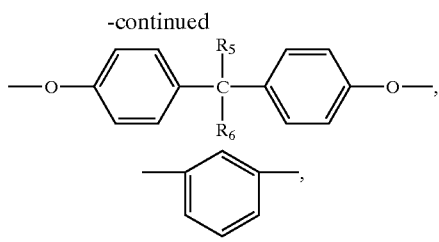

and where $R_5$, $R_6$, and $R_7$ are hydrogen, trifluoro methyl, alkyl groups having from 1 to about 8 carbon atoms, or an aromatic structure.

49. The polymer of claim 46 wherein the polymer has an intrinsic viscosity of from about 1.0 to about 20.0 dL/g.

50. The polymer of claim 49 wherein the polymer has an intrinsic viscosity of from about 2.0 to about 20.0 dL/g.

51. The polymer of claim 46 wherein the molar ratio of X to Y is from bout 0.02 to about 0.25.

52. The polymer of claim 51 wherein the molar ratio of X to Y is from bout 0.025 to about 0.10.

53. The polymer of claim 46 wherein Y ranges from about 1 to about 5.

54. The polymer of claim 53 wherein Y ranges from about 1 to about 4.

55. The polymer of claim 54 wherein Y ranges from about 1 to about 2.

56. The polymer of claim 46 wherein the polymer, upon incorporation in a solid membrane, exhibits liquid crystal characteristics.

57. The polymer of claim 46 wherein B contains bulky constituents.

58. The polymer of claim 57 wherein B is selected from the group consisting of 1,4-bis(4-aminophenyl)-2,3,5-triphenyl benzene ((3P) TDA); 1,4-bis(4-aminophenyl)-2,3,5,6-tetraphenyl benzene ((4P)TDA); 2,2'-dibenzoyl-benzidine (DBB); 1,4 bis-(4-aminophenyl)-2,3 diphenyl-5,6-diphenyl benzene (DBPDPDA); 1,4-bis-(4-aminophenyl)-2,3,-di(2-naphthyl)-5,6-diphenyl benzene (DNDPDA); 1,1'-bis-(4-aminophenylene)-4,4'-(1,4-phenylene) bis-(2,6-diphenyl pyridinium tetrafluoroborate); 1,1'-bis-(4-aminophenylene)-4,4'-(1,4-phenylene) bis-(2,6-bis(4-methyl phenylene)pyridinium tetrafluoroborate); 1,1'-bis-(4-aminophenylene)-4,4'-(1,4-phenylene) bis-(2,6-bis(4-ethoxy phenylene)pyridinium tetrafluoroborate); 2',6',3",5'" tetra (R-phenyl) 4,1""-diaza-pentaphenylene diamine (NHA [R=H]; NMA [R=CH$_3$], NEA [R=ethoxy]); 3,8-diamino-6-phenylphenanthridine (DAPP); and combinations thereof.

59. The polymer of claim 46 wherein B contains displacing constituents.

60. The polymer of claim 59 wherein B is selected from the group consisting of 1,5-diaminonaphthalene (1,5-DAN); 2,6-diaminoanthraquinone (2,6-DAA); 1,5-diaminoanthraquinone (1,5-DAA); Dm-APNTCDI; and combinations thereof.

61. The polymer of claim 46 wherein B contains angled constituents.

62. A polymer for use as a membrane in a fuel cell, the polymer having a Structure I as follows:

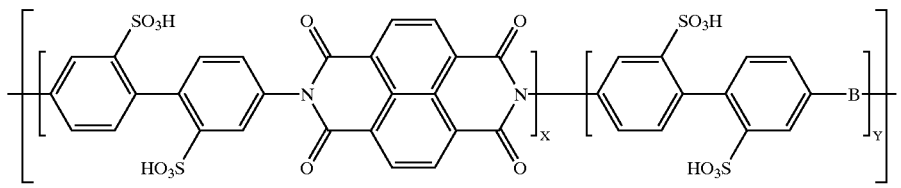

wherein B is a dianhydride, and the molar ratio of X to Y is from about 0.01 to about 0.5.

63. A polymer particularly adapted for use as a membrane in a fuel cell, the polymer having a Structure I as follows:

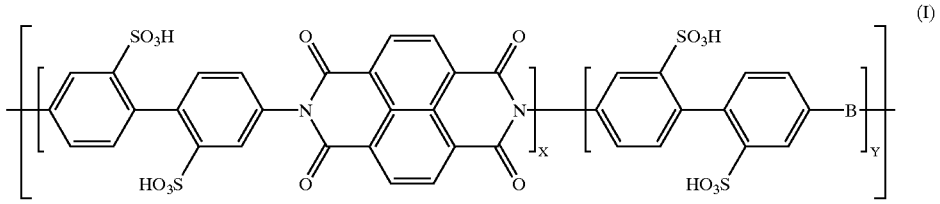

wherein B is a dianhydride, and the molar ratio of X to Y is from about 0.01 to about 0.5.

64. The polymer of claim 62 wherein the molar ratio of X to Y is from about 0.02 to about 0.25.

65. The polymer of claim 63 wherein the molar ratio of X to Y is from about 0.02 to about 0.25.

66. The polymer of claim 65 wherein the molar ratio of X to Y is from about 0.025 to about 0.10.

67. The polymer of claim 63 wherein Y ranges from about 1 to about 5.

68. The polymer of claim 67 wherein Y ranges from about 1 to about 4.

69. The polymer of claim 68 wherein Y ranges from about 1 to about 2.

70. The polymer of claim 63 wherein the polymer, upon incorporation in a solid membrane, exhibits liquid crystal characteristics.

71. The polymer of claim 63 wherein the polymer has an intrinsic viscosity of from about 1.0 to about 20.0 dL/g.

72. The polymer of claim 71 wherein the polymer has an intrinsic viscosity of from about 2.0 to about 20.0 dL/g.

* * * * *